(12) United States Patent
Sakuma et al.

(10) Patent No.: US 6,292,305 B1
(45) Date of Patent: Sep. 18, 2001

(54) VIRTUAL SCREEN DISPLAY DEVICE

(75) Inventors: Nobuo Sakuma, Inagi; Makoto Obu, Yokohama; Akira Momose, Chiba, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/138,954

(22) Filed: Aug. 24, 1998

(30) Foreign Application Priority Data

Aug. 25, 1997 (JP) .................................... 9-228245
Oct. 17, 1997 (JP) .................................... 9-285498
May 15, 1998 (JP) .................................... 10-133530

(51) Int. Cl.$^7$ .............................. G02B 3/00; G02B 27/14
(52) U.S. Cl. ..................... 359/649; 359/630; 359/631; 359/632
(58) Field of Search .................................... 359/630–639, 359/642, 649, 402, 434

(56) References Cited

U.S. PATENT DOCUMENTS 5,883,606 * 3/1999 Smoot ...................................... 345/7

FOREIGN PATENT DOCUMENTS

| 8-147421 | 6/1989 | (JP) . |
| 8-76078 | 9/1994 | (JP) . |
| 8-5956 | 1/1996 | (JP) . |
| 8-146348 | 6/1996 | (JP) . |
| 8-186849 | 7/1996 | (JP) . |
| 8-201722 | 8/1996 | (JP) . |
| 9-243961 | 9/1997 | (JP) . |

* cited by examiner

*Primary Examiner*—Ricky Mack
*Assistant Examiner*—Michael A. Lucas
(74) *Attorney, Agent, or Firm*—Greenberg Traurig, LLP

(57) ABSTRACT

A virtual screen display apparatus includes a display arranged to generate display information and having an effective diagonal length DLC and an optical projecting element arranged to receive the display information from the display and to project and form an image, the optical projecting element having an effective F number which is defined by Fe=S1/PuD wherein S1 is a distance between the display and a principal point of the optical projecting element and PuD is a diameter of an exit pupil of the optical projecting element. A field optical element arranged to form an in-space image in a position of a virtual screen and to direct a divergent light flux from the virtual screen to a view region where the image is viewable to an observer. A diameter of a range in which the image is viewable to the observer in the view region is ERD and a diagonal length of the virtual screen is VSD and a distance between the virtual screen and the view region is VSP, and the following equation is satisfied:

VSD/VSP=DLC/(ERD×Fe).

36 Claims, 20 Drawing Sheets

VIRTUAL SCREEN DISPLAY DEVICE

BACKGROUND OF THE INVENTION

1. Technical Field of the Invention

The present invention relates to a display device which displays an output, such as characters or image information, from an output device such as a computer, a television (TV), a video player, an optical disc drive, a TV phone, a TV or computer game and the like, and more particularly, the present invention relates to a virtual screen (VS) display device which enlarges and displays an image in space as an observed image while a background behind the VS display device can be simultaneously observed. The VS display device can be a VS stereoscopic display device and is applicable to a head-up display (HUD), a head mount display (HMD), a projector type color image display device, a liquid crystal projector, a portable display and other display devices.

2. Description of Related Art

Conventional virtual screen display devices are known in which an image displayed on a cathode ray tube (CRT), a liquid crystal display element (LCD) or another image display is enlarged and displayed in space as an observed image, rather than a displayed image as displayed on the CRT or LCD or the like, by using a hologram combiner or another combiner and such that a background located behind or on the rear side of the combiner can be simultaneously observed or seen while viewing an image displayed on the virtual screen display device. Also, a display device for enlarging and projecting a three-dimensional image is known.

For example, a display system described in Japanese Patent Application Laid-open Publication No. 1-147421/1989 uses a volume phase hologram or the like as a light flux combining element to polarize only a light flux having a specified wavelength and project the specified wavelength light flux toward an observer. The observer can observe the displayed information and another person's face in the same field of view while the displayed information can not be viewed or read by the other person.

A display device described in Japanese Patent Application Laid-open Publication No. 8-201722/1996 is provided with an optical filter including a plurality of surface-splitting filter portions having different transmission wavelengths and a hologram combiner which displays virtual images of a plurality of display images which are transmitted through the filter portions of the optical filter in a different position or substantially the same position as that seen by an observer.

A three-dimensional image projecting device described in Japanese Patent Application Laid-open Publication No. 9-243961/1997 is provided with a projecting lens for enlarging and projecting a three-dimensional image, a first concave mirror forming an enlarged virtual image of the image output from the projecting lens and a second concave mirror forming a real image of an image output from the projecting lens. It is further described that in the three-dimensional image projecting device, first and second holograms are used instead of first and second concave mirrors such that the virtual image of the projecting lens is positioned at the center of curvature of the second concave mirror and such that the first and second holograms are arranged to be connected to each other.

In JP 1-147421/1989, since a volume phase diffraction grating is used as the combiner, a substantially plane surface must serve in the same manner as a spherical surface. Therefore, a display light flux is directed toward the observer's eyes even when the combiner is arranged vertically. However, the display has a disadvantage in that the display can be performed only within a specified wavelength.

In JP 8-201722/1996 described above, an optical filter similar to a display information color filter is divided into a plurality of regions, but the image divided into regions on the optical filter can be displayed at substantially the same position by laminating or exposing multiple layers of the hologram combiner for each wavelength. Therefore, a full-color display is possible. On the other hand, since the image displayed on an LCD or CRT is displayed as a virtual image as it is, the LCD or CRT must be enlarged while maintaining high resolution which results in significantly increased cost. Furthermore, a broad, uniform and highly luminous light source is necessary for such an apparatus for proper viewing of the virtual image. Such a light source is technically complicated and significantly increases the cost of the apparatus.

In JP 9-243961 described above, although the structure is applied to a three-dimensional image projecting device, a field optical element may include a concave mirror or a reflective hologram, i.e., an optical system of a so-called VS (virtual screen) display device. In this device, two components of the concave mirror or the hologram are used to enlarge an observation view region. Specifically, the optical system includes the first concave mirror for forming the enlarged virtual image of the projecting lens and the second concave mirror for forming the real image of the projecting lens, and the observation view region is enlarged by locating the virtual image of the projecting lens in the curvature center of the second concave mirror. However, in this device, a projected object is enlarged about 1.94 times while the observation view field is enlarged twice or about 2.0 times. Therefore, a distinguishing effect cannot be obtained and the image is not easily viewable. Strangely, the magnitude of the projecting lens is not expressly described in this reference, although the projecting lens actually has a size of an exit pupil. Therefore, it is uncertain how much or to what degree the observation view region is enlarged as compared with the related devices described above. Even assuming that an F number of the projecting lens is set to F=1.4, a focal distance f is 300 mm, then the observation view region is 429 mm when the diameter of the exit pupil is 214 mm. Although this is a good value, such level can be realized without using two concave mirrors as described later in the preferred embodiments of the present invention. Moreover, the use of two concave mirrors and locating the virtual image of the optical projecting element formed by the first concave mirror in the curvature center of the second concave mirror excessively restricts the freedom in designing an optical system layout. This means that the possibility of developing various applications is remarkably reduced.

In another related device, conventional projection type color image display devices using a liquid crystal panel are known to use either a three-plate system or a single-plate system. In the three-plate system, three liquid crystal panels are used, and three color component images, i.e., red, green and blue images of a color image to be displayed are displayed on the individual liquid crystal panels. These three liquid crystal panels are separately irradiated with red, green and blue lights, and the red, green and blue lights transmitted through the liquid crystal panels are focused by a common image forming lens to synthetically form an image on a screen, and thereby a color image is displayed.

In the single-plate system, one liquid crystal panel (single-plate liquid crystal panel) is used. Red, green and blue component images are simultaneously displayed on the single-plate liquid crystal panel. The red component image is irradiated with a red light, the green component image is irradiated with a green light and the blue component image is irradiated with a blue light. The red, green and blue light for irradiation is obtained from a single white light source and by using a color separator as described below. Light fluxes transmitted through the single-plate liquid crystal panel are focused by a common image forming lens to form an image on a screen, and thereby a color image is displayed.

In the three-plate system, since the red, green and blue component images are separately displayed on the three liquid crystal panels, each component image can be displayed with a high picture element density. The quality color image having a high picture element density can be displayed, but the cost is significantly increased because the three liquid crystal panels are used.

The single-plate system can be provided for a relatively low cost. However, since the three color component images are simultaneously displayed on one liquid crystal panel, it is difficult to increase the picture element density of the displayed color image.

Furthermore, in both the single-plate system and the three-plate system, a white light from a white light source is color-separated into red, green and blue lights. Since a space for the color separation and an amount of heat generated at the white light source are large, a cooling device for cooling the white light source exclusively and a large cooling space are necessary, which greatly enlarges the color image display device.

Moreover, in the single-plate system, color-separated light fluxes are made incident at mutually different angles on the single-plate liquid crystal panel. Therefore, the color separation of the white light is very difficult.

In addition, as described above, display devices for displaying a stereoscopic image are known. Various three-dimensional display systems are disclosed in the article titled "Three-dimensional Display—Various Systems and Application to Television," Journal of the Television Society Vol. 41, No. 7, p. 610–618 (1987). This article includes a picture of a stereoscopic vision system without glasses using a concave mirror in FIG. 2(i) on page 611. It is further described on page 612 that there is a system in which screen images of two projectors are formed in an interval between both eyes, respectively, by using a large concave mirror or a large convex lens of FIG. 2(i).

In a stereoscopic image display device described in Japanese Patent Application Laid-open Publication No. 8-5956/1996, space modulation elements (display elements) for right and left eyes are disposed substantially at a right angle relative to each other, and between which a half mirror combiner is disposed. A light emitting device as a back light is placed on the side of a rear surface of each space modulation element and each light emitting device is provided with a light emitting region for one eye and a non-light emitting region for the other eye. An optical element with a directivity for enlarging the light emitting region is disposed between the space modulation element and the light emitting device, and images presented for right and left eyes are directed toward the right and left eyes, respectively, in such a manner that a stereoscopic image can be seen without using polarizing glasses or the like. It is also described that the back light is lit in a time-sharing manner and that an optical control device is provided with the light emitting region for one eye and the non-light emitting region for the other eye is disposed between each light emitting device and the space modulation element and that the optical element having the directivity for guiding the light from each transmission region toward each eye is applied before a half mirror. A transmission region of the optical control device is time-shared and a polarizing device is provided on a front surface of a display surface of each display element to introduce orthogonal straight polarized lights into the half mirror and the optical control device having a region which is divided into right and left regions for passing only each polarized light is placed on the front surface of the half mirror.

A single-eye observation view distance-adjusting display device described in Japanese Patent Application Laid-open Publication No. 8-146348/1996 is provided with at least an original image forming unit, a projection lens and an optical pupil mapping device. The optical pupil mapping device is arranged in such a manner that a pupil of the projection lens is mapped to at least one eye pupil of an observer and that a single-eye observation view distance is adjusted independently of a position of the optical pupil mapping device by adjusting an image forming position of the projection lens for an original image. A natural stereoscopic view can be realized by matching the single-eye observation view distance to a both-eye observation view distance and a clear stereoscopic image can be obtained without using special glasses or a lenticular lens.

In Japanese Patent Application Laid-open Publication No. 8-186849/1996, a transmission type stereoscopic visual device without using polarizing glasses is disclosed. Polarizing members each having a polarizing direction which is perpendicular to an adjoining polarizing direction are arranged in a stripe configuration on the side of a rear surface of a screen and lenticular lens plates having a pitch equal to a width of the stripe are disposed on the side of a front surface of the screen. A left-eye projection light for a left eye and a right-eye projection light for a right eye each having a polarized light aligned in the polarizing direction are projected on the screen via a projector.

In JP 8-5956 described above, the space-modulation elements (display elements) for both eyes are arranged at a substantially right angle between which the half mirror combiner is disposed. The light emitting device for the back light is placed on the side of the rear surface of each space modulation element. Although it is not clear why, each light emitting device is provided with the light emitting region for one eye and the non-light emitting region for the other eye. The optical element with the directivity for enlarging the light emitting region is disposed between the space modulation element and the light emitting device. Images presented for right and left eyes are directed to the right and left eyes, respectively. Therefore, a stereoscopic image can be seen without using the polarizing glasses or the like, but the luminous energy is reduced by half or more because the half mirror is used. Furthermore, a control of the light emitting region and the non-light emitting region in order not to overlap right and left images and other various features are described. However, this has little effect although they have a relatively large-scale constitution.

JP 8-146348 describes, by referring to the Journal of Television Society article described above, that it is known that the screen images of two projectors are formed in the interval between both eyes by using a concave mirror or a positive lens. Then, it is described that the device is constituted in such a manner that when the position in which the image of an original image is formed by the projection lens is adjusted, the single-eye observation view distance is adjusted independently of the position of the optical pupil mapping device. It is further described that by matching the single-eye observation view distance with the both-eye observation view distance, a natural stereoscopic view is realized and a clear stereoscopic image can be obtained without using special glasses or the lenticular lens. However, although the matching of the single-eye observation view distance with the both-eye observation view distance and its method are detailed, it is not described in detail how two view regions are arranged.

In JP 8-186849, the polarizing members each having the polarizing direction which is perpendicular to the adjoining polarizing direction are arranged in the stripe configuration on the side of the rear surface of the screen while the lenticular lens plates having the pitch equal to the width of the stripe are disposed on the side of the front surface of the screen. The left-eye projection light for the left eye and the right-eye projection light for the right eye each having a polarized light aligned in the polarizing direction are projected on the screen with the projector. Therefore, the transmission type stereoscopic visual device without using the polarizing glasses is realized. However, since the polarized light is used and the screen is divided into two sections, the luminous energy is reduced to a quarter or even more. Furthermore, since the device is of the rear-surface projection type, the total system is disadvantageously enlarged (lengthened).

SUMMARY OF THE INVENTION

In order to overcome the problems described above, the preferred embodiments of the present invention provide a virtual screen display device which projects and forms an image of an object image displayed on a relatively small image display for displaying characters or image information in a predetermined space so that a real in-space image is observed in a desired position by an observer and so that the observed image is bright, attractive, easy on the observer's eyes to view for long periods of time, high in confidentiality and consumes relatively little energy by defining a relationship between components of such a device to construct a virtual screen (VS) display system effectively and to achieve the above-identified advantages.

According to a preferred embodiment of the present invention, a virtual screen display apparatus includes a display arranged to generate display information and having an effective diagonal length DLC, an optical projecting element arranged to receive the display information from the display and to project and form an image, the optical projecting element having an effective F number which is defined by $Fe=S1/PuD$ wherein S1 is a distance between the display and a principal point of the optical projecting element and PuD is a diameter of an exit pupil of the optical projecting element and a field optical element arranged to form an in-space image in a position of a virtual screen and to direct a divergent light flux from the virtual screen to a view region where the image is viewable to an observer, wherein a diameter of a range in which the image is viewable to the observer in the view region is ERD and a diagonal length of the virtual screen is VSD and a distance between the virtual screen and the view region is VSP, and the following equation is satisfied:

$$VSD/VSP=DLC/(ERD \times Fe).$$

In a further preferred embodiment, the following relationship is satisfied:

$$0.08 < DLC/(ERD \times Fe) < 0.6.$$

Moreover, in the virtual screen display device of the invention, the image display is preferably a cathode ray tube (CRT), a liquid crystal display element (LCD), a digital mirror device (DMD) or another relatively small display which can display an output from an output device such as a computer screen or a television, the output including characters and image information.

The optical projecting element is preferably constructed to enlarge and project the image of an object displayed by the display devices mentioned above and preferably comprises one of a projecting lens, a positive lens, a reflective image forming element, a Fresnel optical system, a hologram, and a concave mirror. Furthermore, the optical projecting element preferably comprises a single lens but may comprise more than one lens.

Similarly, the field optical element preferably comprises a single lens but may comprise more than one lens. Furthermore, the field optical element is preferably arranged such that an image of the in-space image is created at a retina of the observer when the retina of the observer is positioned in the view region.

According to another preferred embodiment of the present invention, a projector type color image display device is constructed and arranged to have an extremely compact configuration while displaying a high quality color image with a high picture element density by using a single space modulation element and eliminates the need for difficult color separation. This preferred embodiment provides a projector color image display device including a space modulation element having a two dimensional arrangement of picture elements which are adapted to display an image to be displayed as a two-dimensional transmittance distribution, a red light source (R light source) which outputs a red light, a green light source (G light source) which outputs a green light and a blue light source (B light source) which outputs a blue light, a dichroic prism arranged to selectively reflect or transmit the respective lights from each of the respective R light source, G light source and B light source, an image forming lens arranged to project light fluxes transmitted through the space modulation element to form an image, an image information input element constructed to input image information of the image to be displayed to the space modulation element, a light source drive arranged to turn on and off the R light source, the G light source and the B light source and a controller arranged to control the image information input element such that a red component image, a green component image and a blue component image of a color image to be displayed are successively or selectively switched and displayed on the space modulation element and arranged to control the light source drive to successively or selectively switch on and off the R light source, the G light source and the B light source and periodically repeat the lighting in such a manner that only the R light source is lit when the red component image is displayed on the space modulation element, only the G light source is light when the green component image is displayed and only the B light source is lit when the blue component image is displayed.

The R light source, the G light source and the B light source preferably include LEDs which are adapted to emit red light, green light and blue light, respectively.

Since the three light sources which separately radiate the red, green and blue lights are used, color separation, which is required in the prior art using a white light source emitting a white light, is not required to be performed.

The R light source, the G light source and the B light source and the space modulation element are arranged to surround the dichroic prism.

The dichroic prism is preferably a substantially rectangular parallelpiped prism element which is arranged to selectively reflect or transmit the red light from the R light source, the green light from the G light source and the blue light from the B light source to irradiate the space modulation element. Specifically, the red, green and blue lights from the R, G and B light sources are synthesized by the dichroic prism to irradiate the space modulation element. The substantially rectangular parallelepiped prism preferably includes a dichroic filter film for at least two of red, green and blue light sources, wherein each of the dichroic filter films is adapted to reflect a selected one of the red, green and blue lights and transmit the others of these lights.

The image information input is a device used to input the information of the image to be displayed into the space modulation element. The image information may include images, data, information, etc. which has been created by a computer, a word processor or the like, and which information is capable of being read as image information from a floppy disc, an optical disc or other suitable storage medium or read via an image scanner or the like.

The controller may comprise a computer, an exclusive CPU, a microprocessor or other suitable control device.

Moreover, the light source drive is preferably constructed and arranged to change a light emitting intensity of each light source (R light source, G light source and B light source). In this case, the light emitting intensity can be manually adjusted. Furthermore, a light source such as a cold cathode tube, a fluorescent tube or electro-luminescence can also be used.

Moreover, although various known space modulation elements can be used, a liquid crystal panel is especially preferred. In this case, a micro lens array for enhancing an incident efficiency of an irradiation light of each picture element can be provided on an incident side of an irradiation light of the liquid crystal panel. Furthermore, the R, G and B light sources can have cooling devices such as a negative cooling device like a cooling fin for radiating a heat from a base which supports the LEDs or a positive cooling device such as a Peltier element and a cooling fan or a provision of both the positive cooling device and the negative cooling device. When both the negative and positive cooling devices are provided, the positive cooling device may be used only in a contributory manner as required.

The projector type color image display device of preferred embodiments of the present invention may include a display medium to which an image forming light flux is projected from the image forming lens. A screen, a concave mirror or a hologram combiner (a flat panel of a hologram for correcting the deflection of the displayed color image and synthesizing an image behind the panel and the displayed color image for observation) may be used as the display medium. The display medium preferably has a diagonal length of about 30 inches or less. A half mirror or a lenticular screen (screen having small-diameter beads embedded in a screen plane and having a high directivity of a reflected light) is also preferably used.

In the projector type color image display device of preferred embodiments of the present invention, the space modulation element, the R, G and B light sources, the dichroic prism and the image forming lens can be disposed on the same base. In this case, the image information input, the light source drive, the controller and an electric system like a power source may be separated from a projector body section.

According to another preferred embodiment of the present invention, a virtual screen stereoscopic display device is arranged and constructed to be compact, low in cost and energy-saving and to easily produce a clear stereoscopic image without using special glasses or a lenticular lens. More specifically, such a preferred embodiment of a virtual screen stereoscopic display device includes at least two displays arranged to display characters and image information, at least two optical projection elements arranged to enlarge, project and form real images of object images displayed by the at least two displays in a display space, the real images formed by the at least two optical projection elements being projected in-space images, and at least one optical focusing system arranged to position light fluxes received from the two projected in-space images at two predetermined view regions, respectively, wherein centers of the two view regions are spaced apart from each other in a transverse direction and the two view regions overlap each other in the transverse direction.

In a specific example of a preferred embodiment of the present invention, the virtual screen stereoscopic display apparatus is arranged such that the centers of the two view regions are spaced from each other by an approximate distance of about 60 mm to 70 mm and are overlapped by about 7 mm or less.

It is preferable that each of the two displays of the virtual screen stereoscopic display apparatus includes at least one of a cathode ray tube, a liquid crystal display, a digital mirror device and a display means which can display an output from a computer, a television or display generating device. Each of the displays is adapted to display images independently and can display the same or different images as required. The two displays are preferably arranged to display right-eye image information on a left side and left-eye image information on a right side when a person is opposed to the two displays.

The optical focusing system includes at least one of a concave mirror, a reflective image forming element, a positive lens, a transmission type image forming element, a Fresnel optical element, a hologram and an optical diffraction element.

For the purpose of illustrating preferred embodiments of the present invention, there is shown in the drawings several forms which are presently preferred, it being understood, however, that the invention is not limited to the precise arrangements and instrumentalities shown.

DETAILED DESCRIPTION OF PREFERRED EMBODIMENTS

Preferred embodiments of the present invention will be described in detail with reference to the accompanying drawings.

Figure 2:
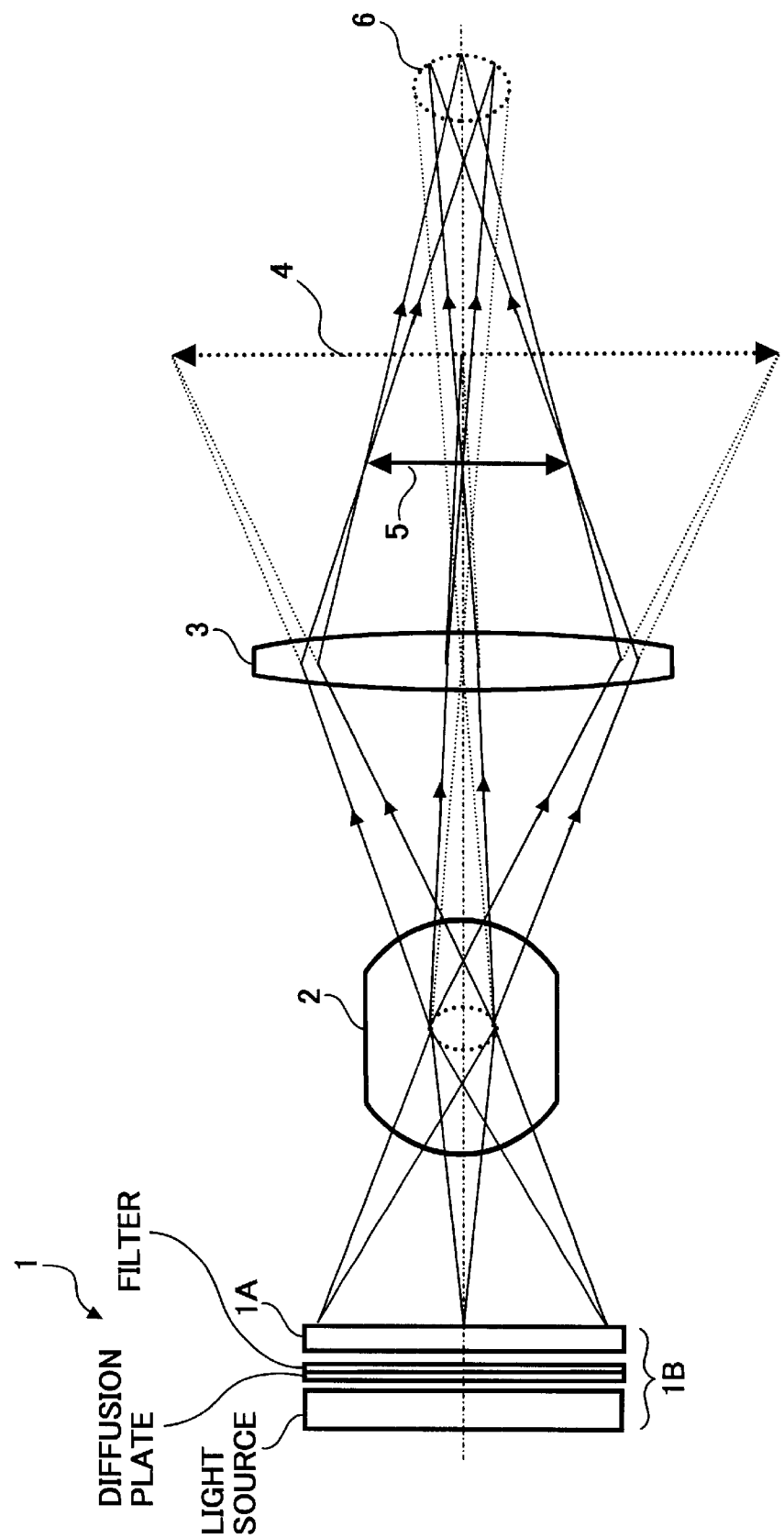
FIG. 2 is an explanatory view showing a basic concept of a virtual screen display device related to preferred embodiments of the present invention.

FIG. 2 is a diagram showing a basic concept of a virtual screen (VS) display device related to preferred embodiments of the present invention. FIG. 2 illustrates an example of a VS display optical system which is provided with an image display 1 for displaying image information, an optical projecting element 2 for projecting and-forming an image of an object image displayed on the image display 1 in a view region and a field optical element 3 for directing a light flux from the in-space image projected by the optical projecting element 2 toward an observer's eyes.

The image display 1 may comprise a cathode ray tube (CRT), a liquid crystal display element (LCD), a digital mirror device (DMD) or other display devices which are adapted to display an output including characters and image information which are output from an apparatus such as a computer or a television (TV). When the image display 1 is a CRT which itself emits light, an additional lighting source or system is not necessary. However, when the image display 1 is an LCD as shown in FIG. 2, a lighting system 1B including a lighting source, a diffusion plate, a filter and other elements is located at the rear surface of the display 1A comprising an LCD. When the image display 1 is a DMD, a special optical system for radiating light to the DMD obliquely from a front surface is necessary.

Furthermore, the optical projecting system 2 enlarges and projects an image output from the CRT or other display which itself emits light or an LCD, DMD or another display apparatus which outputs an image which is transmitted or reflectively lightened by the light source or system described above.

The field optical element 3 is arranged to direct the light flux, which is to be formed as an image at a real screen position 4 (the position at which an image is formed when no field optical element is present), located at the observer's eyes. The field optical element 3 is arranged to change the direction of the light flux with a positive power, form an in-space image in a position of a virtual screen (VS) 5 (the image of the real screen as an object via the field optical element 3), and bring a divergent light flux from the virtual screen into a view region 6 within a range in which the observer's eyes are to be placed. In the example of FIG. 2, a positive lens or another transmissive image forming element is shown as the field optical element 3, but a concave mirror or another reflective image forming element, a Fresnel optical system, or hologram or another diffraction optical element or similar device can also be used as the field optical element.

Examples of applications or apparatuses in which the virtual screen (VS) display device of preferred embodiments of the present invention is incorporated to construct various types of display devices will be described below.

Figure 3A:
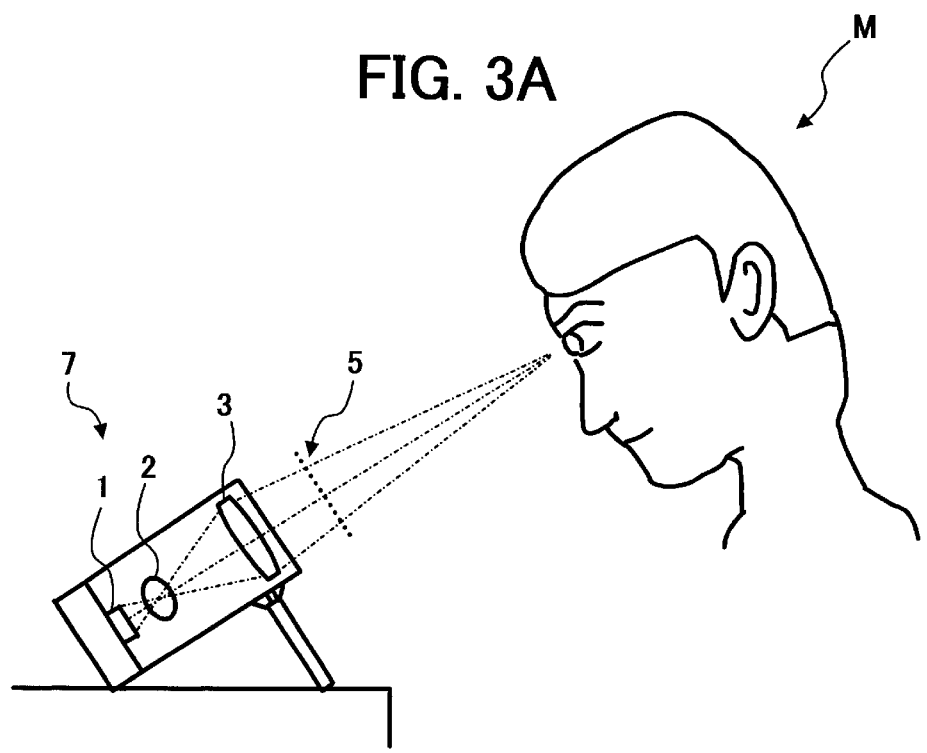
FIGS. 3A and 3B are explanatory views showing an example of an application of the virtual screen display device of preferred embodiments of the present invention.
Figure 3B:
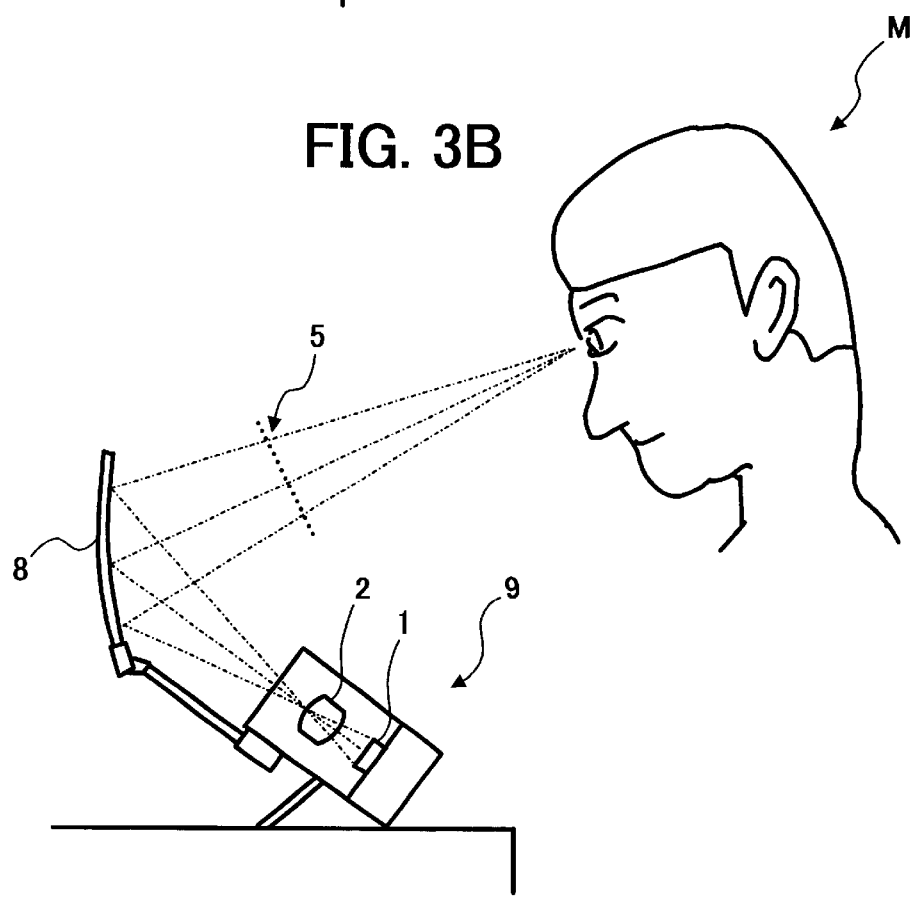

FIGS. 3A and 3B show an example in which the VS display device according to preferred embodiments of the present invention is applied to a portable television (TV). FIG. 3A shows an example of a portable TV 7 using a positive lens as a transmissive image forming element for the field optical element 3 in which a display image of the image display 1 comprising an LCD or other display can be seen as an in-space image in the position of the virtual screen 5.

FIG. 3B shows an example of a portable TV 9 using a reflective image forming element (e.g., a concave mirror) as the field optical element 8, in which a TV body is arranged to have a projector configuration of the image display 1 and the optical projecting system 2 and an image projected by the projector configuration can be seen as an in-space image in the position of the virtual screen 5 via the field optical element 8 which includes a reflective image forming element installed outside of the TV body.

In the preferred embodiment shown in FIG. 3A, since the optical system is contained completely within the TV body, miniaturization can be attained, but a position in which an observer M can view the image is restricted. The preferred embodiment of FIG. 3B is slightly bulky because the reflective field optical element 8 is mounted outside of the TV body, but the degree of freedom in adjusting the position at which the observer M views the image is significantly increased by adjusting the position or angle of the field optical element 8.

Figure 4:
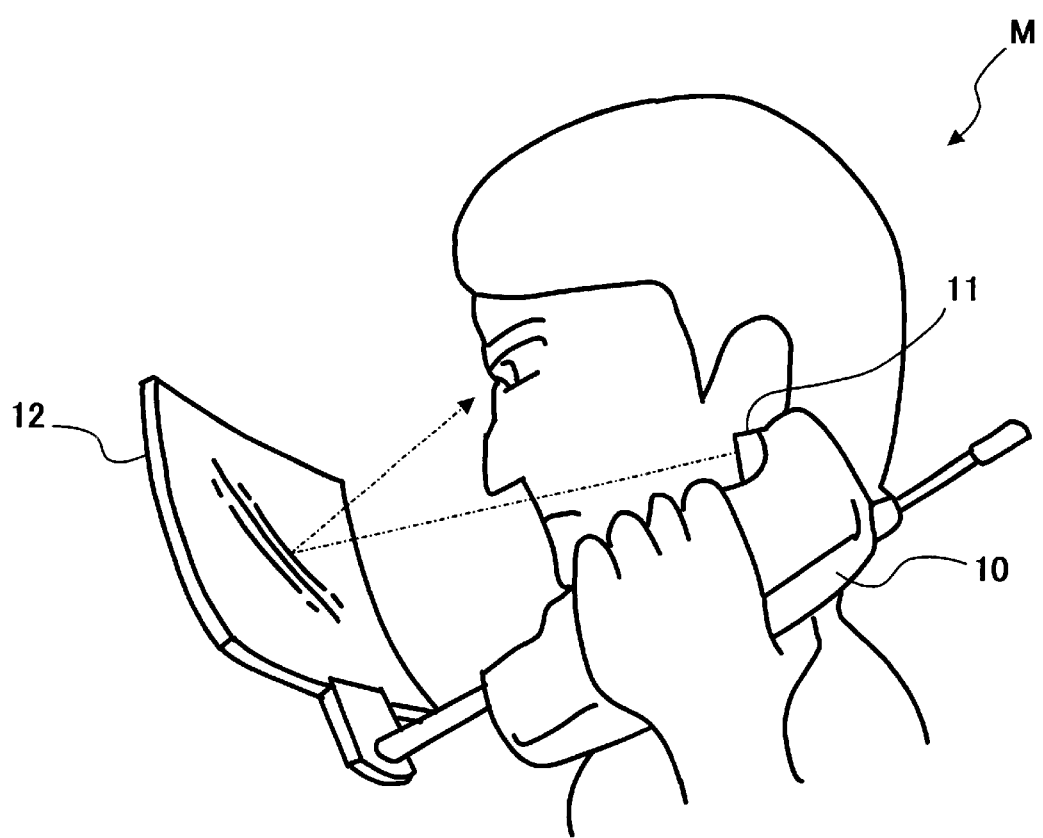
FIG. 4 is an explanatory view showing another example of an apparatus including the virtual screen display device of preferred embodiments of the present invention.

FIG. 4 shows an example in which the VS display device is applied to a portable TV phone, in which a projector section 11 including an image display, an optical projecting element and the like is provided in a TV phone body and a reflective field optical element (e.g., a concave mirror) 12 is mounted outside of the body. In this example, when the reflective field optical element 12 is formed of polycarbonate or another resin material, the TV phone has a very light weight, is extremely portable and can be operated with one hand. Additionally, in the portable TV phone for transmitting an image in addition to receiving an image, a photographing camera such as a CCD or another micro-camera is preferably mounted on the rear surface of the reflective field optical system 12 or the like. Furthermore, in FIG. 4 a phone section and a display device are integrally shown, but a general cellular phone can be mounted on the display device to comprise the phone section.

Figure 5:
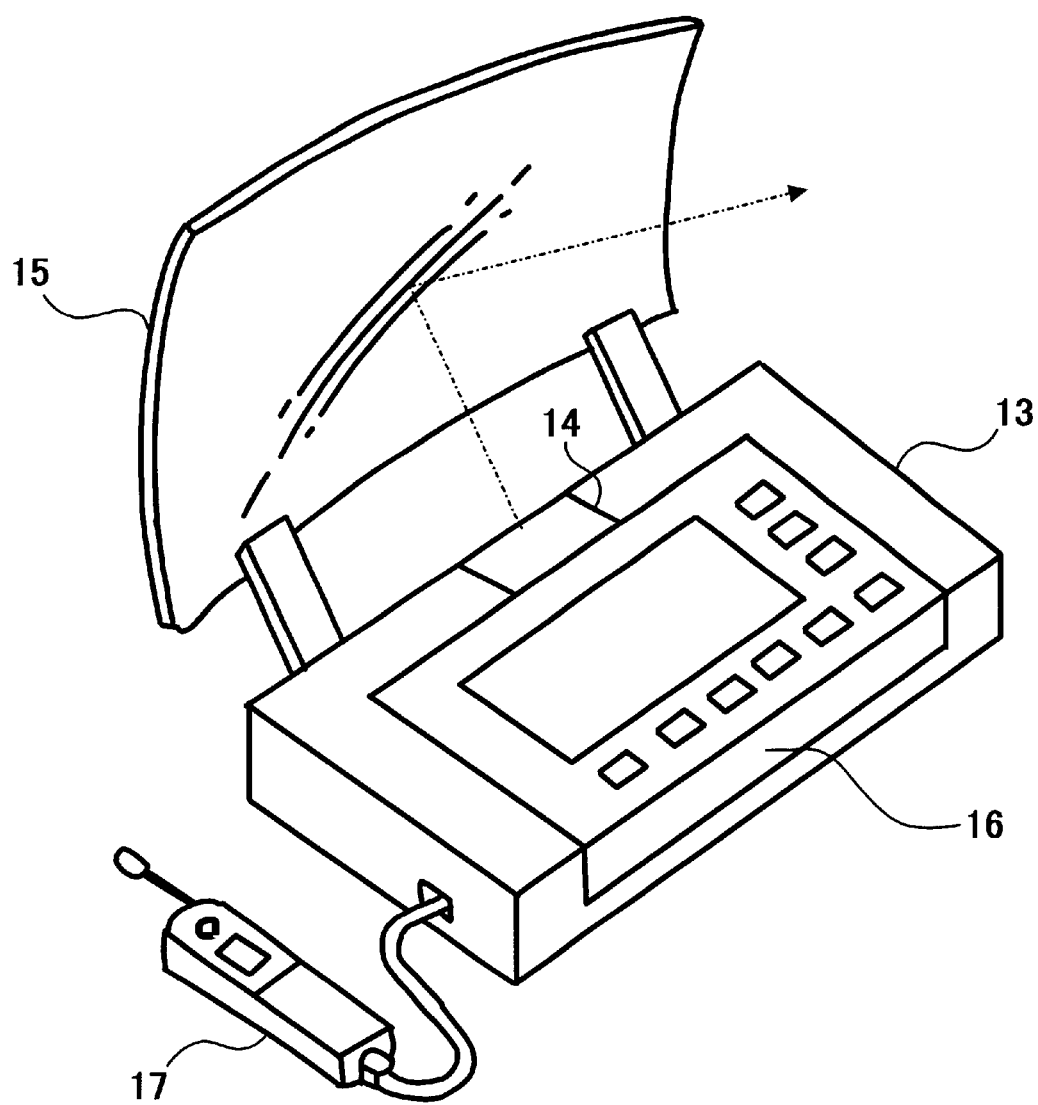
FIG. 5 is an explanatory view showing a further example of an apparatus including the virtual screen display device of preferred embodiments of the present invention.

FIG. 5 shows an example of preferred embodiments of the present invention in which the VS display device is a display device for a small mobile computer. In this example, a projector section 14 including an image display, an optical projecting element and the like is provided in a body of a display device 13 and a reflective field optical element (e.g., concave mirror) 15 is mounted outside of the body. A mobile computer 16 is preferably separate from the display device 13 and the mobile computer 16 can be removed from the display device 13 for independent use. Furthermore, when a modem is built in the display device 13, image information can be received and displayed by the mobile computer 16 by connecting a cellular phone 17 thereto. Moreover, by connecting a CCD or another micro-camera to the device shown in FIG. 5, the device can transmit a photographed image or can operate as a TV phone.

Figure 6:
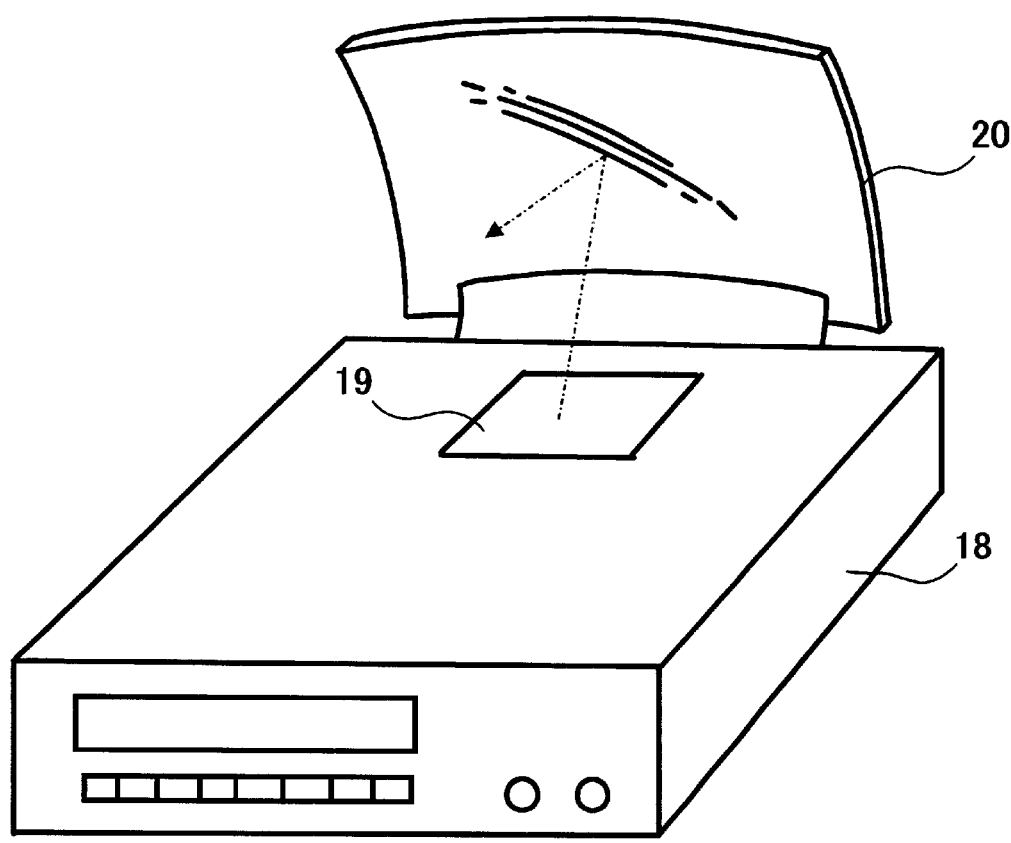
FIG. 6 is an explanatory view showing still a further example of an application of the virtual screen display device of preferred embodiments of the present invention.

FIG. 6 shows an example of preferred embodiments of the present invention in which the VS display device is provided with a portable video player (video tape player, digital video disc (DVD) player) or similar apparatus. A projector section 19 comprising an image display, an optical projecting element and the like is provided in a body of a video player 18, and a reflective field optical element (e.g., a concave mirror) 20 is preferably attached outside of the body.

Figure 7:
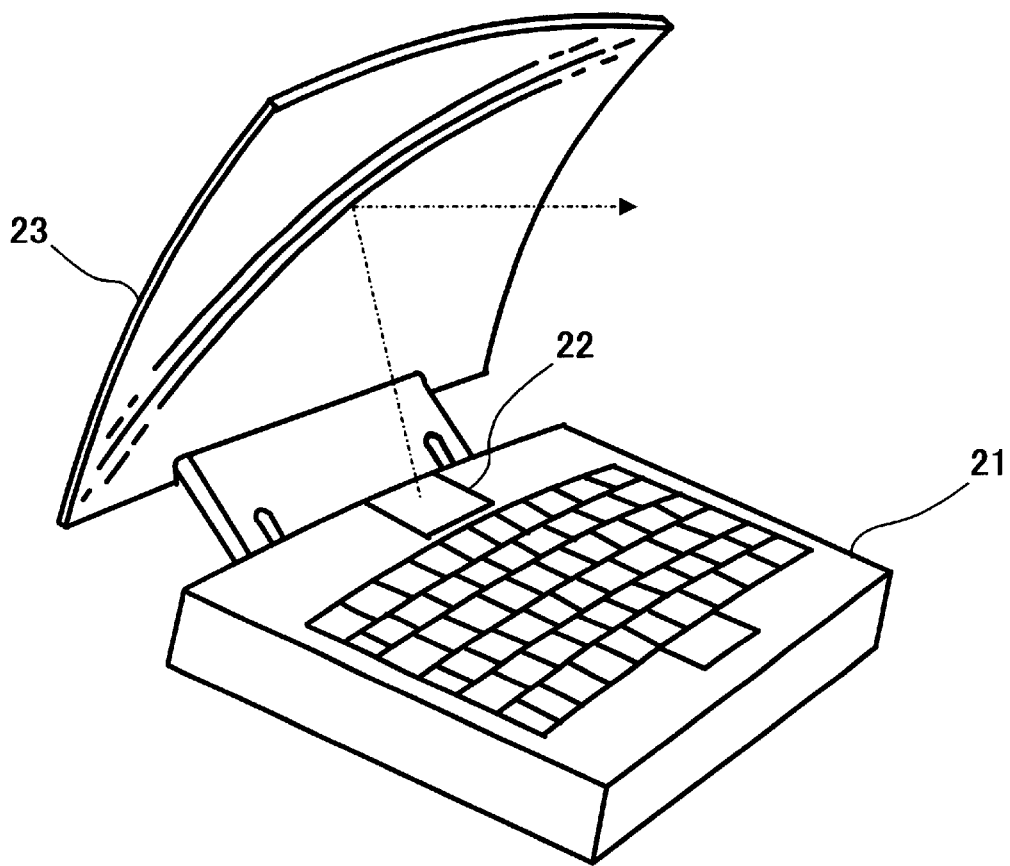
FIG. 7 is an explanatory view showing still a further example of a practical application of the virtual screen display device of preferred embodiments of the present invention.

FIG. 7 shows an example of preferred embodiments of the present invention in which the VS display device comprises a display device of a laptop or notebook personal computer. A projector section 22 including an image display, an optical projecting element and the like is provided in a body of a computer 21, and a reflective field optical element (e.g., a concave mirror) 23 also serving as a lid for the laptop or notebook computer is preferably attached outside of the computer body. The weight of the computer device can be reduced and an amount of energy used can be saved with this configuration as compared with a direct vision display using a typical LCD provided with a back light.

Figure 8:
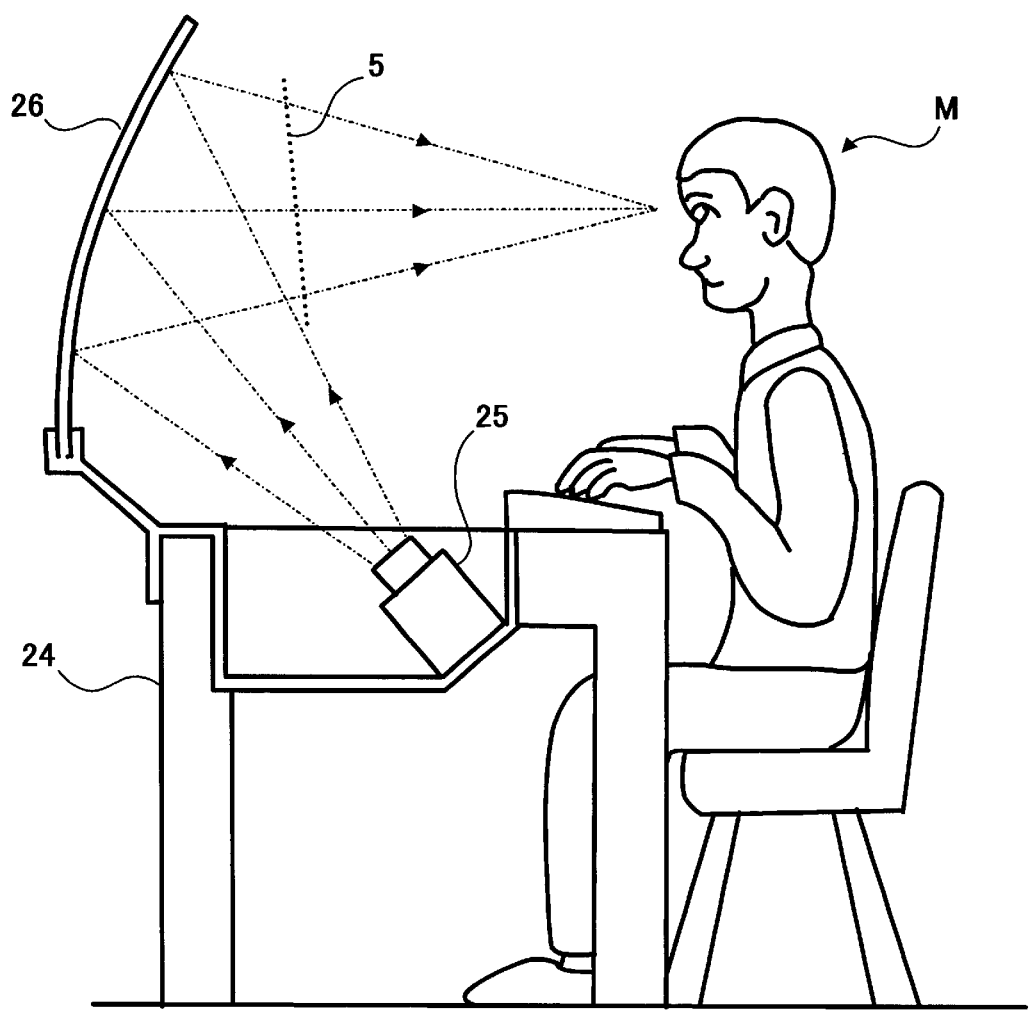
FIG. 8 is an explanatory view showing still a further example of an apparatus including the virtual screen display device of preferred embodiments of the present invention.

FIG. 8 shows an example of preferred embodiments of the present invention in which the VS display device comprises a display device of a desktop personal computer or similar apparatus. A projector section 25 including an image display, an optical projecting element and the like is provided in a desk 24, and a reflective field optical element (e.g., a concave mirror, a reflective hologram or the like) 26 is attached on the desk. In this case, the device occupies less space on the desk as compared to a conventional display such as a CRT or another conventional large-sized display is used. By adjusting the reflectance of the reflective field optical element 26, the background can be seen.

Figure 9:
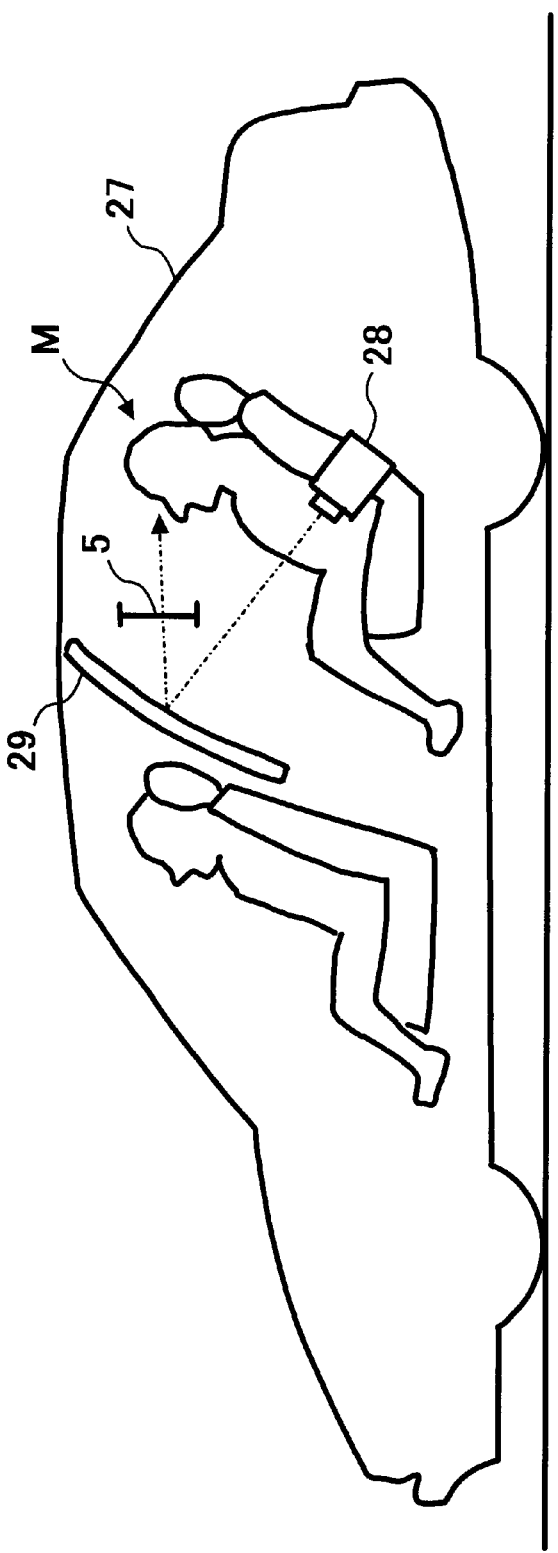
FIG. 9 is an explanatory view showing still a further example of an apparatus including a virtual screen display device of preferred embodiments of the present invention.

FIG. 9 shows an example of preferred embodiments of the present invention in which the VS display device comprises a display device provided on a seat of a taxi, car or other vehicle. A projector section 28 including an image display, an optical projecting system and the like is preferably provided to be viewed by an observer sitting in the back seat, and a reflective field optical element (e.g., a concave mirror) 29 also serving as a protective glass is preferably installed between a driver's seat and the back seat. In this case, by adjusting the reflectance of the reflective field optical element 29 serving also as the protective glass, conditions in front of the car and an displayed image can be simultaneously seen.

Figure 10:
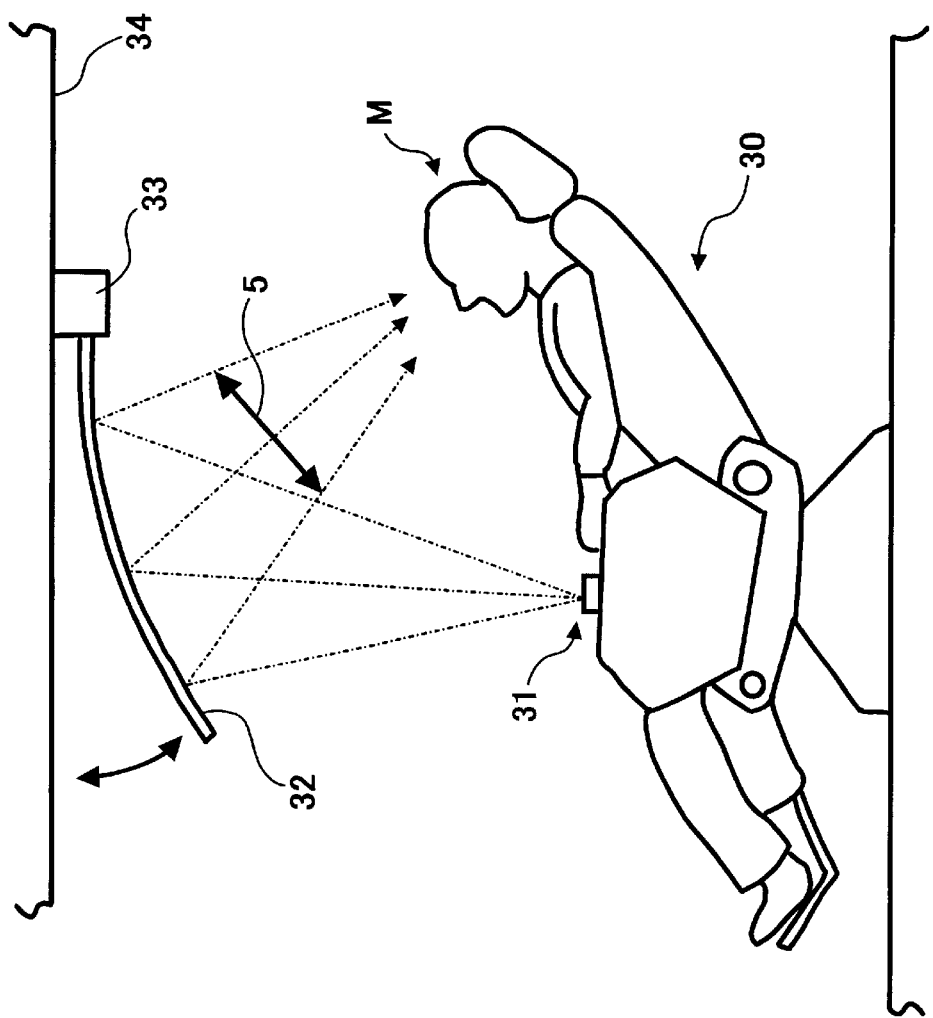
FIG. 10 is an explanatory view showing still a further example of an apparatus including a virtual screen display device of preferred embodiments of the present invention.

FIG. 10 shows an example of preferred embodiments of the present invention in which the VS display device comprises a display device for a seat of an aircraft or other seat viewing configuration. A projector section 31 including an image display, an optical projecting element and the like is provided in an arm or other part of a seat 30, and a reflective field optical element (e.g., a concave mirror) 32 is preferably attached to the ceiling. In this case, the reflective field optical element 32 is moved together with a backrest of the seat 30 by a drive device 33. When the backrest is set upright, the field optical element moves toward the ceiling and does not become an obstruction, and when the backrest is inclined, the field optical element moves toward a display position. When a CRT, an LCD or another conventional display device is used in the dark in the aircraft during a night flight or when the aircraft cabin is not well-lit, light leaks from an image plane to bother others. In the VS display device of preferred embodiments of the present invention as shown in FIG. 10, however, the view region is so narrow that only the observer M can see the image, and the device does not bother others on the aircraft.

Figure 11:
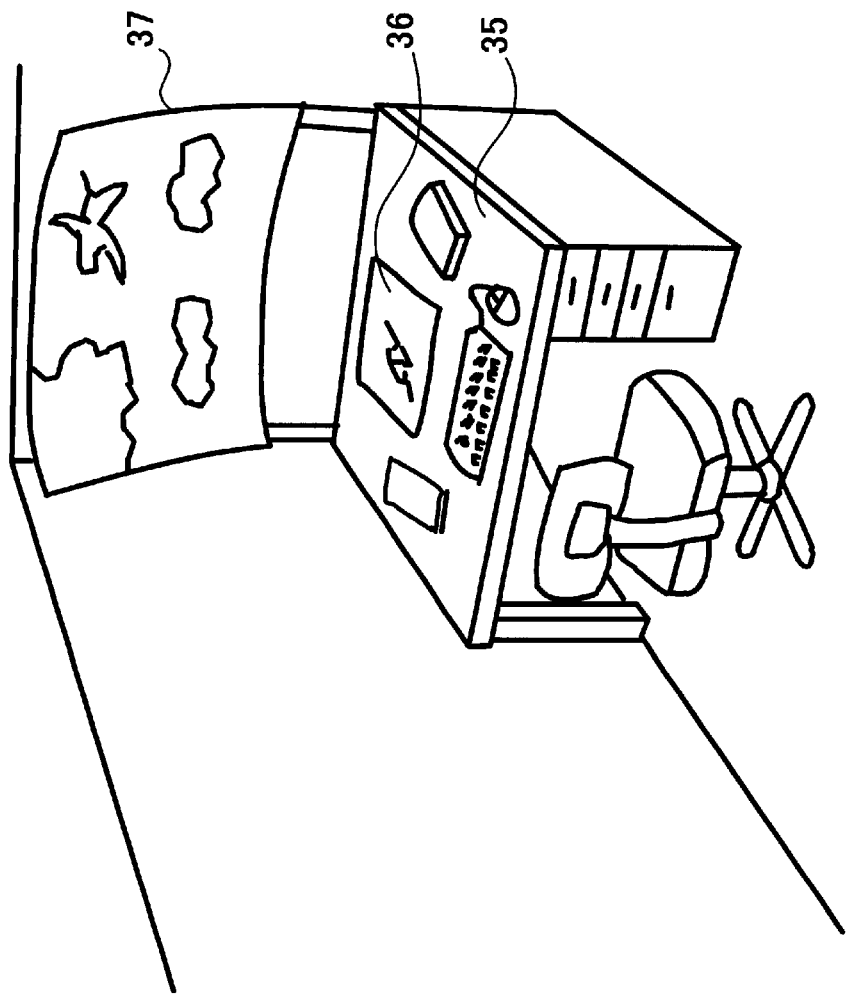
FIG. 11 is an explanatory view showing still a further example of an application of the virtual screen display device of preferred embodiments of the present invention.

FIG. 11 shows an example of preferred embodiments of the present invention in which an image plane of a desktop VS display device similar to the device shown in FIG. 8 is enlarged, and the VS display device is installed in a capsule office or the like. In the VS display device, the size of an image plane of an image display element in a projector section 36 is enlarged, and a large-sized reflective field optical element 37 is installed. The enlargement of the image plane is thus possible. Since the occupying space on a desk 35 is significantly reduced as compared with a conventional CRT having a large image plane, in the capsule office or the like having no window, by installing the large-sized reflective field optical element 37 on a wall surface and displaying a landscape or another image, a user can work without feeling oppressed or claustrophobic even in the narrow capsule office. Moreover, if a notebook computer or the like is connected to the projector section, an image being output by the computer can be displayed on the VS display device.

Figure 12A:
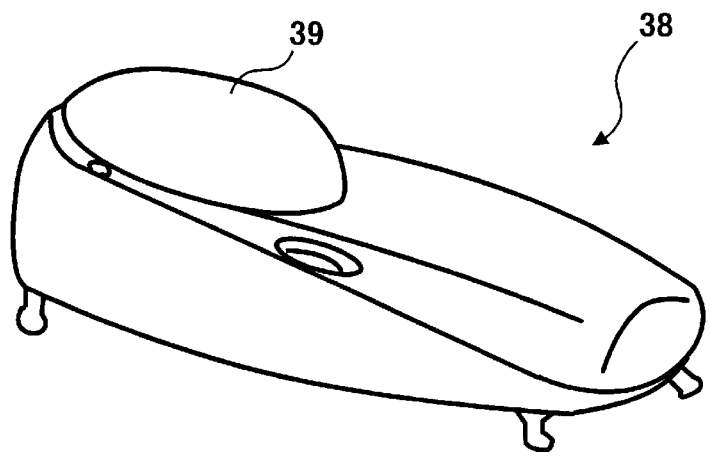
FIGS. 12A and 12B are explanatory views showing still further examples of applications of the virtual screen display device of preferred embodiments of the present invention.
Figure 12B:
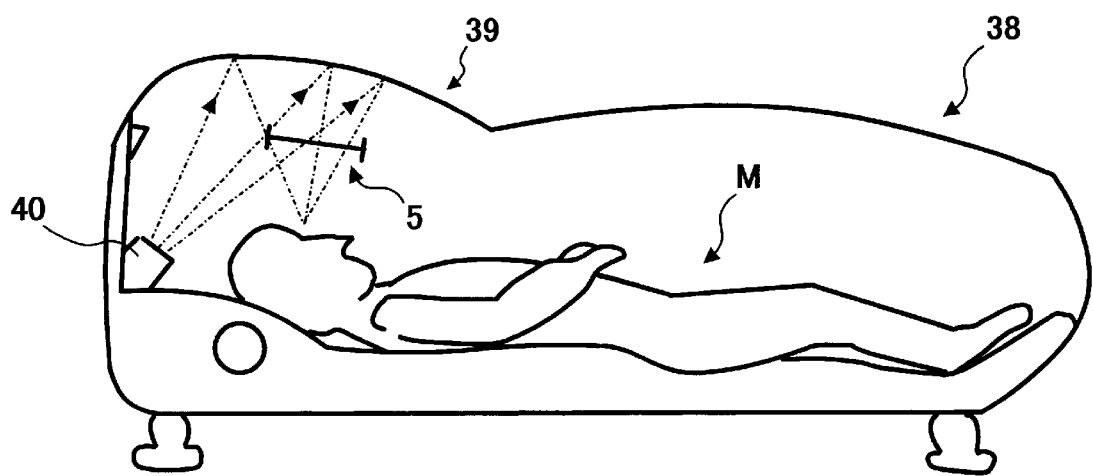

FIGS. 12A and 12B show an example of preferred embodiments of the present invention in which the VS display device comprises a display device in a relaxation capsule. A projector section 40 including an image display, an optical projecting element and the like is provided preferably beside a pillow in a capsule 38, and a concave surface of a spherical window of the capsule 38 is used as a reflective field optical element 39. In this case, since a person M can see an image displayed on a virtual screen 5 and the outside of the window simultaneously, he can relax without feeling oppressed or claustrophobic even in a narrow capsule space.

Figure 13:
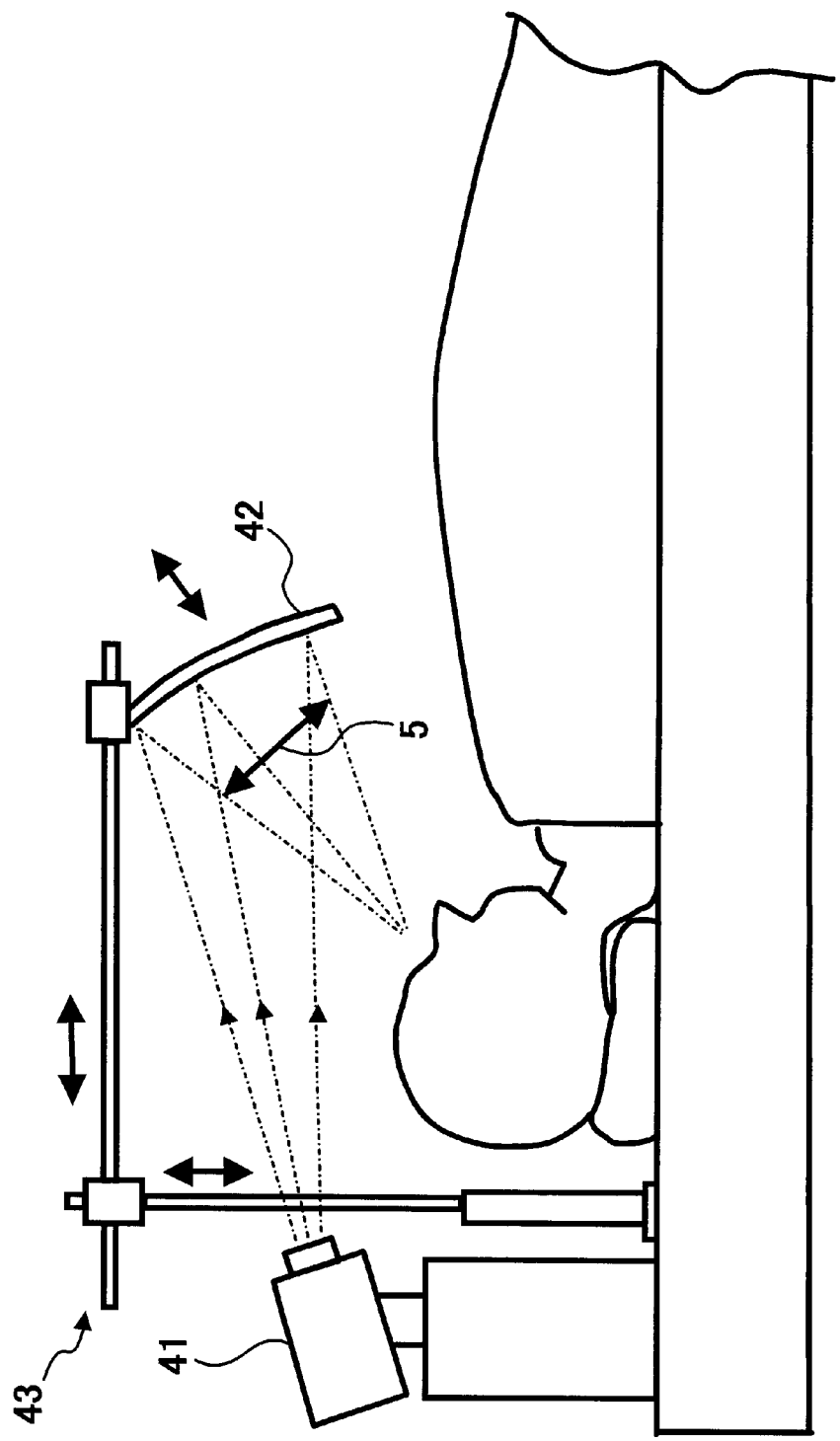
FIG. 13 is an explanatory view showing still a further example of an apparatus including the virtual screen display device of preferred embodiments of the present invention.

FIG. 13 shows an example of preferred embodiments of the present invention in which the VS display device is installed on a bed in a hospital or the like. A projector section 41 including an image display, an optical projecting element and the like is provided beside a pillow or the like of the bed, and a reflective field optical element (e.g., a concave mirror) 42 is movably supported on a stand 43. In this example, since the position of the reflective field optical element 42 can be optionally adjusted and set, a virtual screen 5 can be set in a position where a patient can most easily see the screen while lying in the bed. When the conventional CRT or LCD is used in a common room or the like in the hospital, a light leaks from an image plane and bothers other patients, but in the VS display device of preferred embodiments of the present invention, a view region is so narrow that only an observer lying in the bed upon which the display is mounted can see an image displayed thereby, and the device does not bother others.

Figure 14:
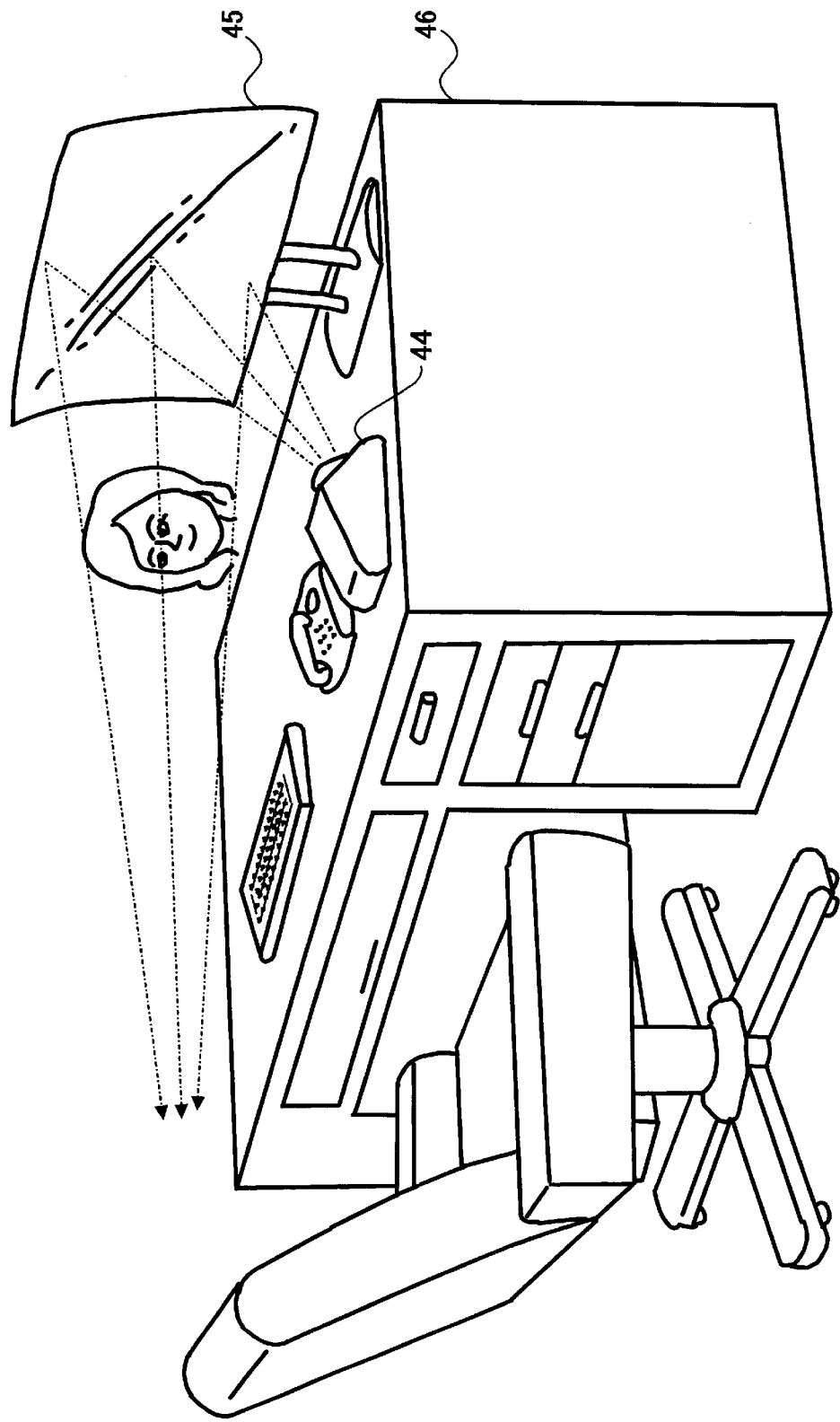
FIG. 14 is an explanatory view showing still a further example of an apparatus including the virtual screen display device of preferred embodiments of the present invention.

FIG. 14 shows an example of preferred embodiments of the present invention in which the VS display device comprises an executive display installed in a President's room, a Director's room or the like. A projector section 44 includes an image display, an optical projecting element and the like and is provided on or in a desk 46, while a large-sized reflective field optical element (e.g., a concave mirror) 45 is installed on the desk. Since the projector section 44 is connected to a video camera which is installed in an neighboring secretary's room, a secretary's face is displayed on an in-space virtual screen to inform the President or Director that a visitor is coming and the visitor's face can also be displayed if necessary so that the President or Director can see the visitor. Additionally, a person can usually work while facing an image plane of a personal computer or the like displayed on the screen, or an image plane of TV or video can also be displayed. Moreover, when the reflectance of the reflective field optical systems 45 is set to be relatively low, the background can be seen, and when the image display is unnecessary, the outside of the window or the like behind the reflective field optical system 45 can be seen.

Various application examples of the VS display device according to preferred embodiments of the invention have been described. The VS display device can be used in many different types of devices covering a broad spectrum of products from a portable type display with a small image-plane size to an installation type display with a large image-plane size. Therefore, it is important to design the optical system in accordance with a particular use or application, and it is necessary to clarify a physical range in which the principle of the VS display system effectively works. However, as will be described below, it has been extremely difficult to design, arrange and construct such a VS display device for any particular use or application.

In the virtual screen (VS) display device using the basic principle shown in FIG. 2 including the display 1, the optical projecting element 2 and the field optical element 3, in such prior art devices, it was necessary to conduct trial and error processes in order to plan and design the characteristics and arrangement of each of the elements 1–3 in the device in order to obtain a device which functions properly and is capable of forming a clear image at an observer's viewing position. Thus, if the application of the display device shown in FIG. 2 was changed, it was necessary to change the size, arrangement and configuration of the elements shown in FIG. 2 in order to obtain an acceptable display device and to achieve a desired clear image at a desired viewing region. This required a great amount of time and expense and was very difficult.

To overcome these difficulties, the applicant of the preferred embodiments of the present invention discovered a relationship which, when used, allows for precise definition and determination of the physical and optical characteristics and configuration and arrangement of the elements of the display device so that no trial and error was necessary but an exact arrangement could easily be known through use of the unique relationship discovered.

More specifically, it was discovered that an inverse relationship exists between a position of the virtual screen 5 and the position of the view region 6. This relationship was not known or discovered before. It was also discovered that this inverse relationship exists in both the vertical (up and down) direction of FIG. 1 and in a plane perpendicular to the plane of FIG. 1.

Furthermore, the applicant discovered that in addition to the inverse relationship described above, the size and physical characteristics of the display 1, the optical projecting element 2 and the field optical element 3 are related and that just knowing a diagonal length of the virtual screen 5 and a distance from the virtual screen 5 to the view region 6, an exact relationship between the elements of the display device can be determined using the discovered relationship so that the device can be arranged exactly according to the relationship and no trial and error is necessary to arrange and construct the device. Thus, if a certain apparatus or application using such a display device is requested and the size of the virtual screen 5 and a distance between the virtual screen 5 and the view region 6 is known, the relationship according to preferred embodiments of the present invention can be used to manufacture the device exactly and without having to resort to trial and error for arranging the various components of the device. In addition, it is possible to use the discovered relationship to change the length of the virtual screen VSD or a diameter of the range in which the image is viewable to the observer without having to change the characteristics of the display 1, the optical projecting element 2 or the field optical element 3 which was not possible previously.

Figure 1:
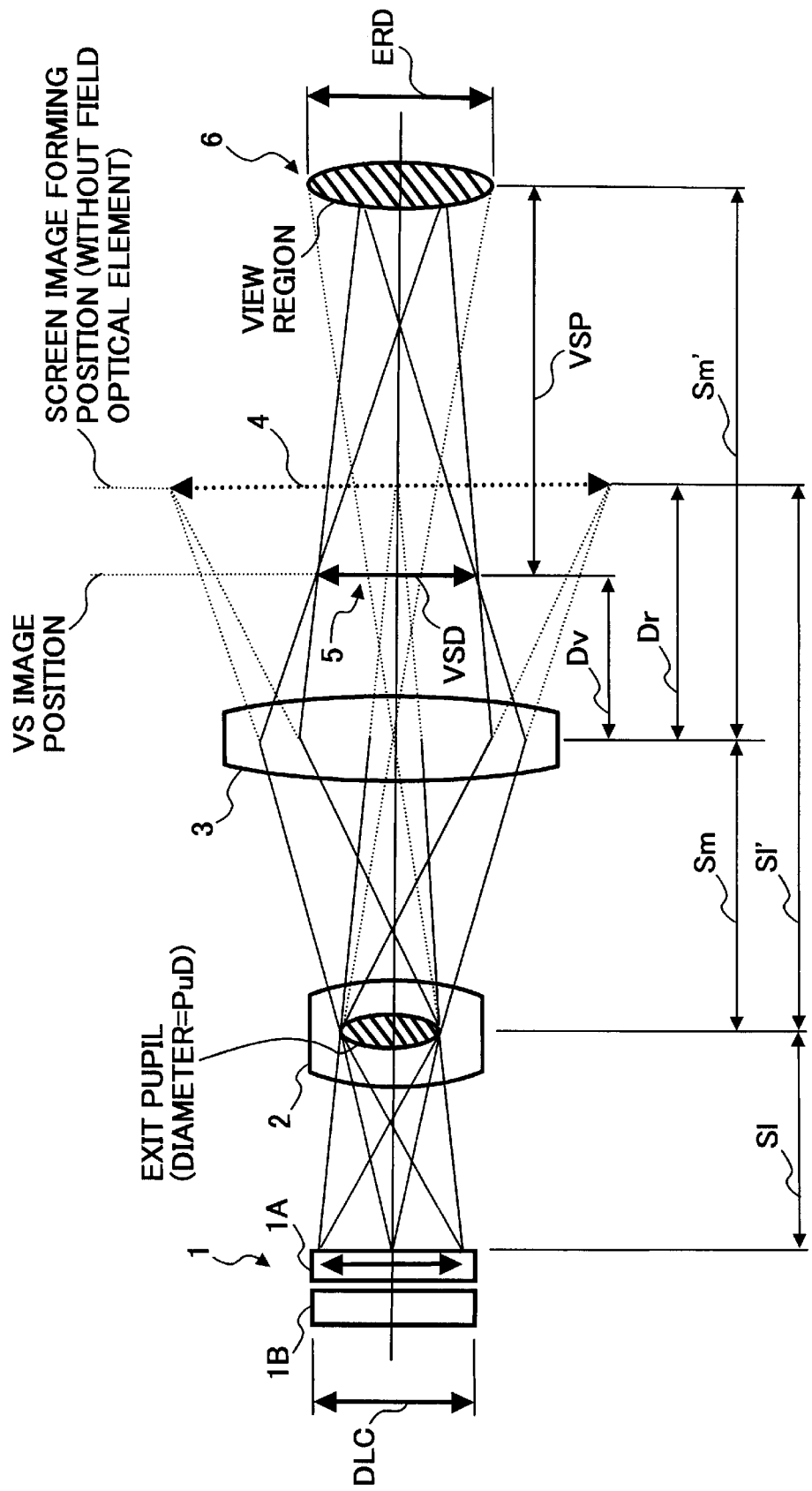
FIG. 1 is an explanatory view illustrating an optical arrangement of a virtual screen display device according to preferred embodiments of the present invention.

The relationship according to preferred embodiments of the present invention described above will be described in more detail. As shown in FIG. 1, when an effective diagonal length of the image display 1 is DLC, a diameter of a range or view region 6 in which the image is visible to the observer (view region diameter) is ERD, a diagonal length of the virtual screen is VSD, an effective Fe number of the optical projecting element 2 is Fe=S1/PuD, in which S1 is a distance of the display relative to a principal point of the optical projecting element and PuD is a diameter of an exit pupil of the optical projecting element, and a distance from a virtual screen 5 to a view region 6 is VSP, then the following formula is satisfied:

$$VSD/VSP=DLC/(ERD \times Fe)$$

By using the above-defined relationship, a view region necessary for various applications is secured, while a necessary visual angle is satisfied, while allowing the arrangement and characteristics of the elements of the display device shown in FIG. 1 to be determined exactly from the relationship.

In a further preferred embodiment, the above-identified relationship is modified to be as follows:

$$0.08 < DLC/(ERD \times Fe) < 0.6$$

In the above, the positive lens or another transmissive image forming element has been described as the field optical element 3, but the concave mirror or another reflective image forming element can be used as the field optical element. When the concave mirror (spherical concave mirror) is used as the field optical element of FIG. 1, the curvature radius R of the spherical concave mirror has the following relationship with the focal distance fm of the lens:

$$R=2fm$$

Now, preferred embodiments of the VS display device satisfying the aforementioned conditions will be described.

In a first preferred embodiment, a presently available minimum LCD, i.e., a 0.55 type LCD (DLC=0.55 inch, about 14 mm) is used as a display element constituting the image display 1. Because of its compactness/lightness, the first preferred embodiment is used mainly as a display device of the portable TV shown in FIG. 3, the portable TV phone shown in FIG. 4, the small-sized mobile computer shown in FIG. 5 or the like.

A projecting lens with a focal distance f1 of about 40 mm and an F number of about 1.2 is preferably used as the optical projecting element 2, and an LCD comprising the image display element is placed in S1=−36 mm before the principal point of the lens. Additionally, the focal distance of the field optical system 3 is preferably set to fm=166.7 mm, and the concave mirror (spherical concave mirror) having a curvature radius R of about 333 mm is used as the field optical element.

As described above, the LCD is located such that S1=−36 mm before the principal point of the projecting lens while the concave mirror comprising the field optical element is placed 250 mm (Sm=−250 mm) behind the principal point, and a view region where the observer's eyes are located is Sm'=500 mm from the concave mirror. Then, the virtual screen (VS) 5 having a diagonal length VSD of 52.6 mm, i.e., about 2.1 inches is floated in space with the VSP of about 270 mm before the observer's eyes.

In this case, VSD/VSP is 0.194, ERD is 66.7 mm, a (half) angle OA extended by the LCD relative to the projecting lens is 11 degrees and the effective F number Fe is 1.1. Although it is difficult to correct spherical aberration or comatic aberration, this device according to the first preferred embodiment has a significantly improved and sufficient correction of spherical aberration and comatic aberration.

Furthermore, the diameter of the view region ERD is 66.7 mm, and may not be considered to be sufficient relative to a usual distance of about 62 to about 65 mm between a person's eyes. However, in the first preferred embodiment, since the image display device is portable, the observer can easily bring the view region toward his eyes. Therefore, the device has no special problem.

In a second preferred embodiment, in the same manner as in the first preferred embodiment, a 0.55 type LCD (DLC= 0.55 inch, about 14 mm) is used as a display element 4 constituting the image display 1. Because of its compactness/lightness, the second preferred embodiment is used mainly as the display device of the portable TV shown in FIG. 3, the portable TV phone shown in FIG. 4, the small-sized mobile computer shown in FIG. 5 or other similar devices.

A projecting lens with the focal distance f1 of 40 mm and the F number of 1.8 is used as the optical projecting element 2, and an LCD is used as the image display element which is placed at S1=−32 mm before the principal point of the lens. Additionally, the focal distance of the field optical system 3 is set to fm=190.5 mm, and the concave mirror (spherical concave mirror) having a curvature radius R of 381 mm is used as the field optical element 3.

As described above, the LCD is located at S1=−32 mm before the principal point of the projecting lens while the concave mirror functioning as the field optical element 3 is placed 250 mm (Sm=−250 mm) behind the principal point, and the view region is Sm'=800 mm from the concave mirror. Then, the virtual screen (VS) 5 having a diagonal length VSD of 60.7 mm, i.e., about 2.4 inches is floated in space with the VSP being about 444 mm before the observer's eyes.

In this case, VSD/VSP is 0.137, ERD is 71.7 mm, a (half) angle OA extended by the LCD relative to the projecting lens is 12.3 degrees and the effective F number Fe is 1.4. Furthermore, the diameter of the view region ERD is 71.7 mm. Therefore, a slightly broader view region can be obtained as compared with the first preferred embodiment.

In the third preferred embodiment, in the same manner as in the first and second preferred embodiments, a 0.55 type LCD (DLC=0.55 inch, about 14 mm) is used as a display element constituting the image display 1. Because of its compactness/lightness, the preferred embodiment is used as a display device of a portable TV, a portable TV phone, a small-sized mobile computer or other suitable device. The third preferred embodiment is the same as the first and second preferred embodiments in the optical system arrangement and the like. Therefore, detailed numerical values of portions are shown in Tables 1 and 2 below, which lists preferred embodiments, and further description is omitted.

In a fourth preferred embodiment, a 1.35 type LCD (DLC=1.35 inch, about 34.3 mm) is used as a display element constituting the image display 1. Because of its high density and moderate compactness/lightness, the fourth preferred embodiment is used mainly as the display device of the mobile computer shown in FIG. 5 or a notebook type personal computer, the display device of the portable video player shown in FIG. 6 or the display device installed on the rear seat of a vehicle (passenger's seat in the taxi) shown in FIG. 9.

A projecting lens with the focal distance f1 of 40 mm and the F number of 1.4 is used as the optical projecting element 2, and an LCD being the image display element is placed at S1=−48 mm before the principal point of the lens. Additionally, the focal distance of the field optical element 3 is set to fm=176.5 mm, and the concave mirror (spherical concave mirror) having a curvature radius R of 353 mm is used as the field optical element 3.

As described above, the LCD is placed at S1=−48 mm before the principal point of the projecting lens while the concave mirror functioning as the field optical element 3 is placed 250 mm (Sm=−250 mm) behind the principal point, and the view region is located Sm'=600 mm from the concave mirror. Then, the virtual screen (VS) 5 having a diagonal length VSD of 181.9 mm, i.e., about 7.2 inches is floated in space and a VSP is about 610 mm before the observer's eyes.

In this case, VSD/VSP is 0.298, ERD is 68.6 mm, a half angle OA extended by the LCD relative to the projecting lens is 19.7 degrees and the effective F number Fe is 1.7. Furthermore, the diameter of the view region ERD is 71.7 mm. Therefore, a slightly broader view region can be obtained as compared with the first preferred embodiment.

In fifth to eighth preferred embodiments, in the same manner as in the preferred fourth preferred embodiment, a 1.35 type LCD (DLC=1.35 inch, about 34.3 mm) is used as a display element constituting the image display 1. Because of its high density and moderate compactness/lightness, each of the fifth to eighth preferred embodiments is used mainly as a display device of a mobile computer or a notebook type personal computer, a display device of a portable video player or the like or a display device installed in a vehicle (passenger's seat in a taxi) or the like. These preferred embodiments are the same as the fourth preferred embodiment in the optical system arrangement and the like. Therefore, detailed numerical values of portions are shown in the Tables 1 and 2 below, and further description is omitted.

In ninth to thirteenth preferred embodiments, a 3.3 type LCD (DLC=3.3 inch, about 83.8 mm) is used as a display element constituting the image display 1. Each of the preferred embodiments is used as the display device of a laptop (or usual notebook type) personal computer shown in FIG. 7 requiring a relatively large image plane, the desktop display device for use in the desktop personal computer or another OA equipment shown in FIG. 8, the display device for the personal TV which a patient can watch in a hospital bed while lying therein as shown in FIG. 13, a display device of a personal TV on which a person can watch a favorite program, video or the like without being interfered with by others or as another display device for use in a broad application. These preferred embodiments are also the same as the fourth preferred embodiment in the optical system arrangement and the like. Therefore, detailed numerical values of portions are shown in the Tables 1 and 2 below, and further description is omitted.

In fourteenth to nineteenth preferred embodiments, a 5-type CRT (DLC=5.0 inches, i.e., 127 mm) with high definition is used as a display element constituting the image display 1 to obtain a bright and large image plane having high definition. Each of the preferred embodiments is used as a three-dimensional CAD VS display, the display for the capsule office shown in FIG. 11, the display for the relaxation capsule shown in FIG. 12, the executive display shown in FIG. 14 or as another display device for use in a broad application. An application as a high featured version of a personal TV or the like is also possible. These preferred embodiments are also the same as the fourth preferred embodiment in the optical arrangement or the like. Therefore, detailed numerical values of portions are shown in the Tables 1 and 2 below, and further description is omitted.

TABLE 1

LIST 1 OF PREFERRED EMBODIMENTS

| EMBODIMENT | VSD/VSP | VSP | VSD (mm) | VSD (inch) | ERD | DLC (inch) |
|---|---|---|---|---|---|---|
| 1 | 0.194 | 270.7 | 52.6 | 2.07 | 66.7 | 0.55 |
| 2 | 0.137 | 444.3 | 60.7 | 2.39 | 71.7 | 0.55 |
| 3 | 0.109 | 469.7 | 51.3 | 2.02 | 88.9 | 0.55 |
| 4 | 0.298 | 610.6 | 181.9 | 7.16 | 68.6 | 1.35 |
| 5 | 0.244 | 479.7 | 116.8 | 4.60 | 97.8 | 1.35 |
| 6 | 0.223 | 488.4 | 109.0 | 4.29 | 96.0 | 1.35 |
| 7 | 0.278 | 491.8 | 136.9 | 5.39 | 48.9 | 1.35 |
| 8 | 0.306 | 546.3 | 167.4 | 6.59 | 72.7 | 1.35 |
| 9 | 0.349 | 423.8 | 147.8 | 5.82 | 120.0 | 3.30 |
| 10 | 0.349 | 610.0 | 212.9 | 8.38 | 120.0 | 3.30 |
| 11 | 0.454 | 685.3 | 310.9 | 12.24 | 94.3 | 3.30 |
| 12 | 0.476 | 771.9 | 367.5 | 14.47 | 78.6 | 3.30 |
| 13 | 0.524 | 888.9 | 465.6 | 18.33 | 83.3 | 3.30 |
| 14 | 0.451 | 1025.9 | 462.5 | 18.21 | 125.7 | 5.00 |
| 15 | 0.484 | 1265.1 | 612.1 | 24.10 | 133.9 | 5.00 |
| 16 | 0.397 | 1280.0 | 508.0 | 20.00 | 166.7 | 5.00 |
| 17 | 0.423 | 1666.7 | 705.6 | 27.78 | 170.5 | 5.00 |
| 18 | 0.353 | 3000.0 | 1058.4 | 41.67 | 204.5 | 5.00 |
| 19 | 0.106 | 2769.8 | 292.9 | 11.52 | 600.0 | 5.00 |

TABLE 2

LIST 2 OF PREFERRED EMBODIMENTS

| EMBODIMENT | Fe | OA (deg.) | S1 | PuD | F | f1 | fm | Sm | Sm' |
|---|---|---|---|---|---|---|---|---|---|
| 1 | 1.1 | 11.0 | −36.0 | 33.3 | 1.2 | 40.0 | 166.7 | −250 | 500 |
| 2 | 1.4 | 12.3 | −32.0 | 22.2 | 1.8 | 40.0 | 190.5 | −250 | 800 |
| 3 | 1.4 | 9.9 | −40.0 | 27.8 | 1.8 | 50.0 | 190.5 | −250 | 800 |
| 4 | 1.7 | 19.7 | −48.0 | 28.6 | 1.4 | 40.0 | 176.5 | −250 | 600 |
| 5 | 1.4 | 21.3 | −44.0 | 30.6 | 1.8 | 55.0 | 190.5 | −250 | 800 |
| 6 | 1.6 | 19.7 | −48.0 | 30.0 | 2.0 | 60.0 | 190.5 | −250 | 800 |
| 7 | 2.5 | 12.6 | −77.0 | 30.6 | 1.8 | 55.0 | 153.8 | −250 | 400 |
| 8 | 1.5 | 13.8 | −70.0 | 45.5 | 1.1 | 50.0 | 153.8 | −250 | 400 |
| 9 | 2.0 | 22.7 | −100.0 | 50.0 | 2.0 | 100.0 | 176.5 | −250 | 600 |
| 10 | 2.0 | 29.2 | −75.0 | 37.5 | 2.0 | 75.0 | 190.5 | −250 | 800 |
| 11 | 2.0 | 28.6 | −77.0 | 39.3 | 1.4 | 55.0 | 176.5 | −250 | 600 |
| 12 | 2.2 | 25.5 | −88.0 | 39.3 | 1.4 | 55.0 | 166.7 | −250 | 500 |
| 13 | 1.9 | 27.6 | −80.0 | 41.7 | 1.2 | 50.0 | 166.7 | −250 | 500 |
| 14 | 2.2 | 35.8 | −88.0 | 39.3 | 1.4 | 55.0 | 190.5 | −250 | 800 |
| 15 | 2.0 | 31.2 | −105.0 | 53.6 | 1.4 | 75.0 | 285.7 | −400 | 1000 |
| 16 | 1.9 | 38.4 | −80.0 | 41.7 | 1.2 | 50.0 | 200.0 | −250 | 1000 |
| 17 | 1.8 | 27.9 | −120.0 | 68.2 | 1.1 | 75.0 | 285.7 | −400 | 1000 |
| 18 | 1.8 | 27.9 | −120.0 | 68.2 | 1.1 | 75.0 | 375.0 | −500 | 1500 |
| 19 | 2.0 | 32.4 | −100.0 | 50.0 | 2.0 | 100.0 | 230.8 | −250 | 3000 |

As described above, in the virtual screen (VS) system according to preferred embodiments of the present invention, the image of the object image displayed on a relatively small image display (micro CRT, LCD, DMD or the like) for displaying image information is projected and formed in a predetermined space and an observer observes the in-space real image via the field optical system in the specified position, and, by clarifying the physical range in which the principle of the VS display system effectively works, a luminous, attractive, gentle to view, highly confidential and less energy consuming virtual screen display device is realized.

Moreover, the VS display device according to preferred embodiments of the present invention can be applied to a broad range of devices from the small-sized display device having superior portability for use in a portable TV, a portable TV phone, a portable video player, a mobile computer, a notebook computer or the like, and the middle-sized display device of the desktop personal computer, a personal TV or the like to a relatively large-sized installation type display device such as a capsule office display, a relaxation capsule display, a executive display and the like.

When the VS display device of preferred embodiments of the present invention is used as the display device of the computer or another OA equipment, the space on a desk occupied by the device is significantly reduced as compared with the conventional CRT display. Furthermore, since the observer does not need to directly watch the CRT image plane or the like, eye fatigue is alleviated and health problems caused by electromagnetic waves are avoided. Since the VS display device of preferred embodiments of the present invention is also provided with the function of adjusting the image forming position (optical axis direction), a user can easily set the optimum image forming position (optical axis direction) at the time of use so that eye fatigue is further alleviated. Also, the device is convenient or favorable especially for a presbyopic person because the virtual screen image can be displayed in a visual distance that is within his or her reach.

Moreover, in the VS display device of preferred embodiments of the present invention, since the in-space image is displayed, the visual angle is narrowed according to the principle described above and the range in which the image plane is visible is restricted. Considering that the portable equipment, the personal computer, the personal TV or the like is usually operated by an individual, a wide visual angle which is difficult to be designed is unnecessary, and rather a narrow visual angle with high confidentiality (to allow the image displayed to be unviewable by others) is provided. Additionally, since the visual angle is narrow, the displayed image can be seen only by an operator without bothering others even if the display device is operated in the aircraft, the train, the common room in the hospital or another public place.

Figure 15:
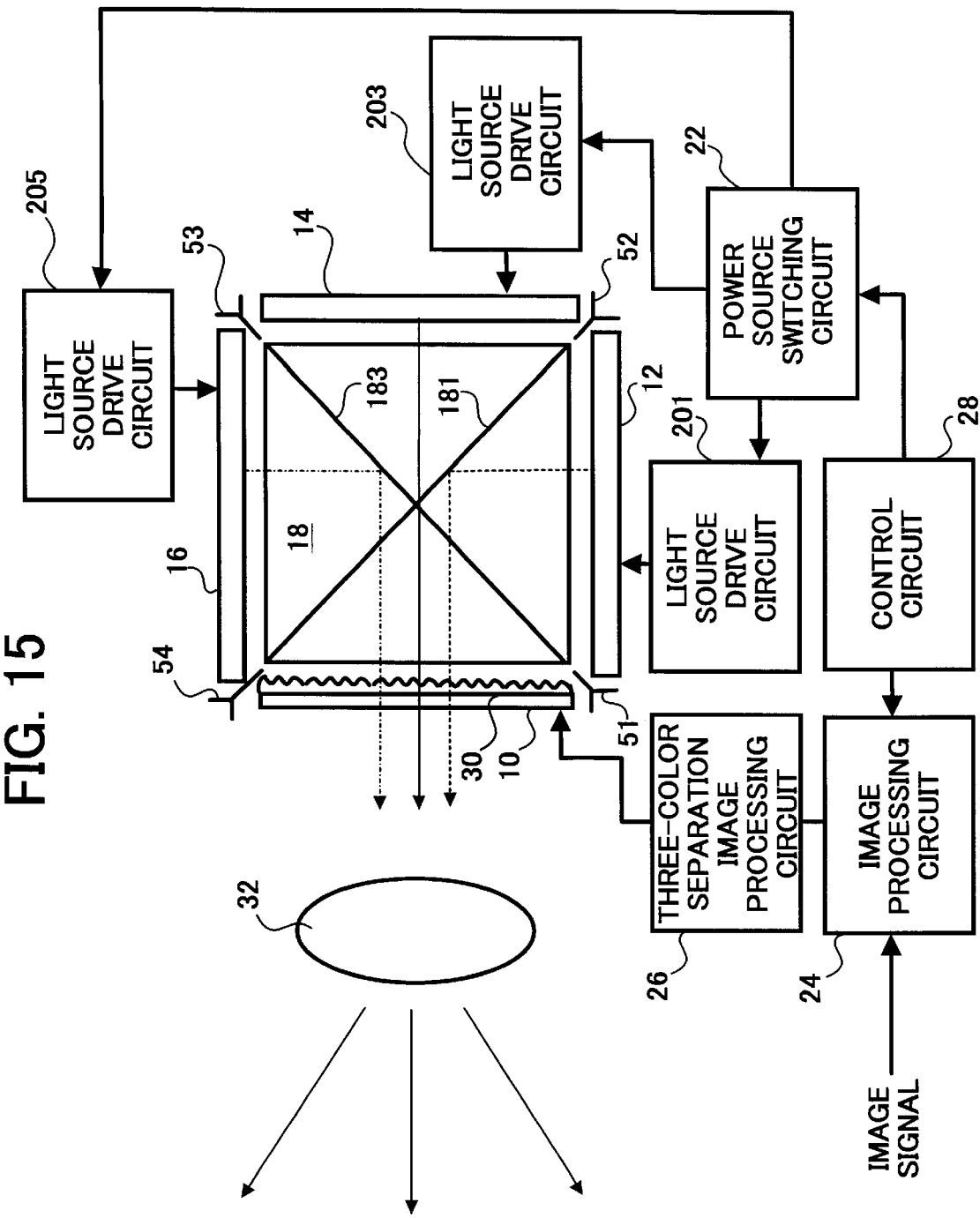
FIG. 15 is a schematic drawing of a projection color image display device according to a preferred embodiment of the present invention.

FIG. 15 shows a projector color image display device according to another preferred embodiment of the present invention. In FIG. 15, a liquid crystal display panel 10 is arranged to function as a space modulation element. A plurality of light sources are provided including a red light source (R light source) 12 for emitting a red light, a green light source (G light source) 14 for emitting a green light, and a blue light source (B light source) 16 for emitting a blue light.

A dichroic prism 18 is arranged near the panel 10 to selectively reflect or transmit the red light from the R light source 12, the green light from the G light source 14 and the blue light from the B light source 16 so as to synthesize the red, green and blue lights to irradiate the space modulation element 10. The dichroic prism 18 preferably includes a substantially rectangular parallelepiped configuration (shown in a square configuration in FIG. 15) in which dichroic filter films 181 and 183 cross substantially perpendicularly to each other.

A light source drive includes a power switching circuit 22 and drive circuits 201, 203 and 205. The light source drive circuits 201, 203 and 205 are electrically connected to a respective one of the R light source 12, the G light source 14 and the B light source 16 to turn on and off the R light source 12, the G light source 14 and the B light source 16, respectively. The light source drive circuits 201, 203 and 205 preferably have power sources built therein, so that light-emitting power currents of the light sources can be adjusted manually or via an external controller.

An image processing circuit 24 and a three-color separation image processing circuit 26 are also provided and operate as described below. The image processing circuit 24 and the three-color separation image processing circuit 26 constitute an image information input.

An image forming lens 32 is provided for projecting light fluxes transmitted from the liquid crystal display 10 to form an image.

The R light source 12, the G light source 14 and the B light source 16 preferably include LEDs which are adapted to radiate red, green and red lights, respectively. The R light source 12, the G light source 14 and the B light source 16 and the liquid crystal panel 10 are arranged to surround the four sides of the substantially rectangular dichroic prism 18. On a surface of the liquid crystal panel 10 on the side of the dichroic prism 18, a micro lens array 30 is preferably disposed to contact the liquid crystal panel 10.

The dichroic filter film 181 in the dichroic prism 18 reflects the red light and transmits the green and blue lights. The dichroic filter film 183 reflects the blue light and transmits the red and green lights. Therefore, when the R light source 12 is lit, the radiated red light is reflected by the dichroic filter film 181 in the dichroic prism 18, transmitted through the dichroic filter film 183 and radiated via the micro lens array 30 to the liquid crystal panel 10. When the G light source 14 is lit, the radiated green light is transmitted through the dichroic filter films 181 and 183 and radiated via the micro lens array 30 to the liquid crystal panel 10. When the B light source 16 is lit, the radiated blue light is reflected by the dichroic filter film 183, transmitted through the dichroic filter film 181 and radiated via the micro lens array 30 to the liquid crystal panel 10.

The power source switching circuit 22 receives a command from a control circuit 28 to switch the power sources of the light source drive circuits 201, 203 and 205. Through this switching, the R light source 12, the G light source 14 and the B light source 16 are turned on and off.

An image to be displayed is entered as an image signal to the image processing circuit 24. The image processing circuit 24 is controlled by the control circuit 28 to image-process the input image signal in a mode which can be displayed on the liquid crystal panel 10, and transmits a processing result to the three-color separation image processing circuit 26. The three-color separation image processing circuit 26 image-processes and separates the entered image information into a red component image, a green component image and a blue component image, successively switches the red, green and blue component images at a high speed and displays the red, green and blue component images. on the space modulation element 10.

The control circuit 28 constituting the controller of the apparatus controls the image information input 24 and 26 in such a manner that the red, green and blue component images of the color image to be displayed (entered as the image signal) are successively switched at a high speed and displayed on the space modulation element 10, and controls the light source drive unit 201, 203, 205 and 22 to successively switch on and off the R, G and B light sources exclusively at a high speed and periodically repeat the lighting in such a manner that only the R light source 12 is lit when the red component image is displayed on the space modulation element 10, only the G light source 14 is lit when the green component image is displayed and only the B light source 16 is lit when the blue component image is displayed.

Therefore, the red, green and blue component images displayed on the liquid crystal panel 10 are irradiated with the red, green and blue lights, respectively. At this time, each color light is effectively collected at an opening of each picture element by the micro lens array 30 (in which individual micro lenses are arranged to have a one-to-one correspondence with individual picture elements of the liquid crystal panel), and efficiency of light use is greatly improved.

In this manner, the red, green and blue component images are successively switched and displayed in the red, green and blue lights on the liquid crystal panel 10 as an object plane of the image forming lens 32. When these images are projected via the image forming lens 32 to form an image on a screen or another display medium, the red component image via the red light, the green component image via the green light and the blue component image via the blue light are successively switched to form the image on the display medium. When the speed of the switching becomes sufficiently high, these three color images are synthesized and visually recognized as the color image in human eyes.

In the above description, the high speed at which the red, green and blue component images are successively switched and displayed on the space modulation element and the R, G and B light sources are successively turned on and off exclusively to periodically repeat the lighting indicates a speed at which the component images are switched on the display medium in such a manner that the color image is visually recognized by the human eyes.

Specifically, the preferred embodiment shown in FIG. 15 preferably includes: a space modulation element 10 having a two-dimensional arrangement of picture elements having a light transmittance that can be controlled and arranged to display an image to be displayed as a two-dimensional transmittance distribution; the R light source 12 which emits the red light; the G light source 14 which emits the green light; the B light source 16 which emits the blue light; the dichroic prism 18 for selectively reflecting or transmitting the red light from the R light source 12, the green light from the G light source 14 and the blue light from the B light source 16 to irradiate the space modulation element 10; the image forming lens 32 for projecting the light fluxes transmitted through the space modulation element 10 to form the image; the image information input 24 and 26 for inputting the image information of the image to be displayed to the space modulation element 10; the light source drive 201, 203, 205 and 22 for turning on and off the R, G and B light sources 12, 14 and 16; and the controller 28 which controls the image information input 24 and 26 in such a manner that the red, green and blue component images of the color image to be displayed are successively switched at a high speed and displayed on the space modulation element 10 and controls the light source drive 201, 203, 205 and 22 to successively switch on and off the R, G and B light sources exclusively at a high speed and periodically repeat the lighting in such a manner that only the R light source 12 is lit when the red component image is displayed on the space modulation element 10, only the G light source 14 is lit when the green component image is displayed and only the B light source 16 is lit when the blue component image is displayed. The R, G and B light sources 12, 14 and 16 preferably include LEDs which radiate red, green and blue lights, respectively.

The dichroic prism 18 is preferably a substantially rectangular parallelepiped prism which has the dichroic filter film 181 for reflecting the light and transmitting the green and blue lights and the dichroic filter film 183 for transmitting the red light reflected by the dichroic filter film 181 and the green light and reflecting the blue light. The R, G and B light sources 12, 14 and 16 and the space modulation element 10 are arranged to surround the four surfaces of the dichroic prism 18 as seen in FIG. 15. The space modulation element preferably comprises a liquid crystal panel 10. The micro lens array 30 for enhancing the incident efficiency of the irradiation light to each picture element is provided on the incident side of the irradiation light of the liquid crystal panel 10 which functions as the pace modulation element.

Additionally, in the control mode of the control circuit 28, by displaying a single-color image on the liquid crystal panel 10 and lighting the R, G and B light sources 12, 14 and 16 simultaneously, successively or selectively, a monochromatic image may be displayed. In this case, by lighting one or two of the light sources, the monochromatic image can be displayed in various colors. Alternatively, for example, by alternately switching and displaying the red and blue component images and synchronously turning on/off the R and B light sources, the two component images can be synthesized and displayed as a yellow image.

Figure 16:
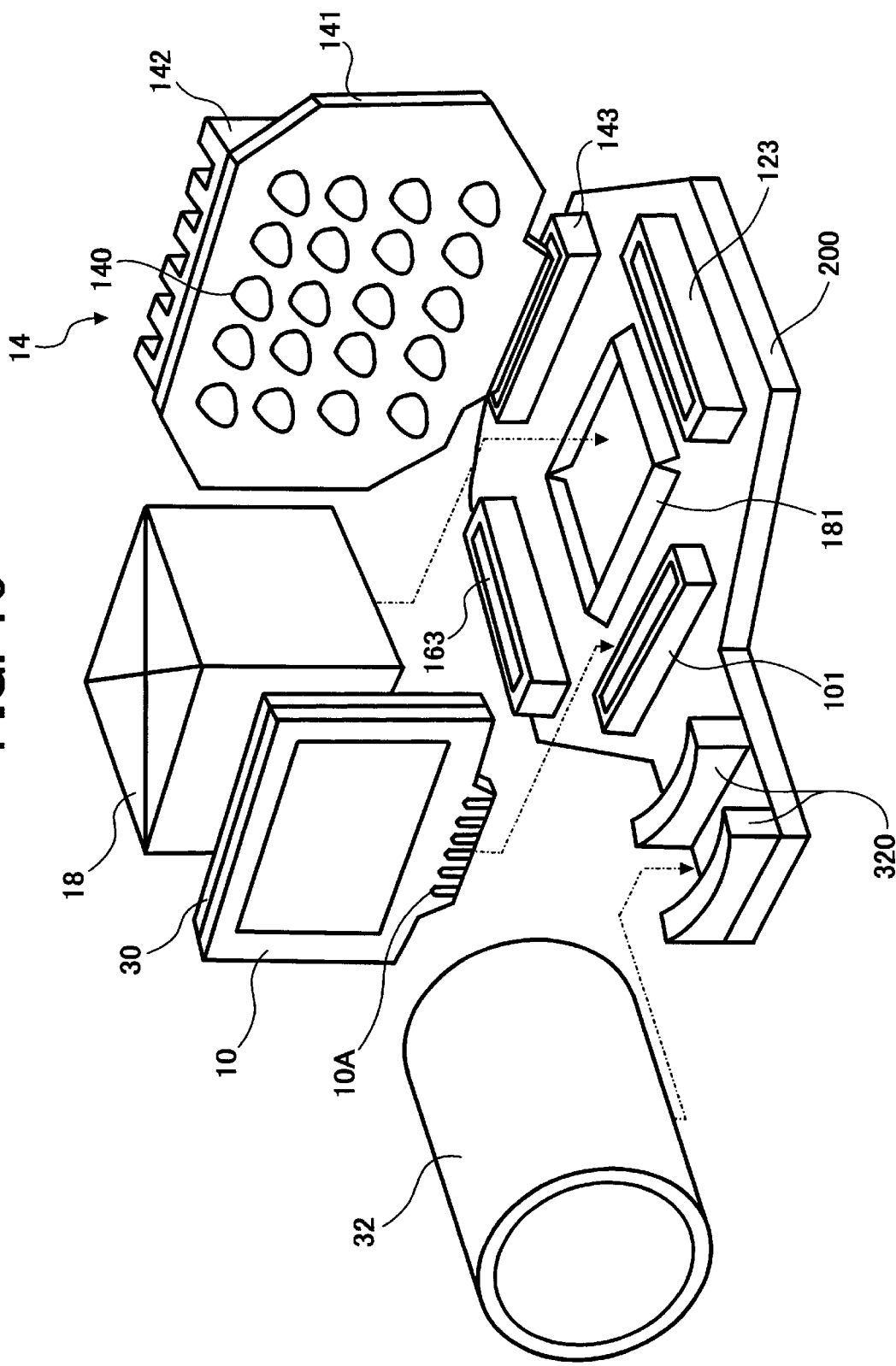
FIG. 16 is a isometric plan view of the structural configuration of the preferred embodiment shown in FIG. 15.

FIG. 16 is an explanatory view showing an arrangement of the liquid crystal panel, the light sources, the dichroic prism and the image forming lens of the preferred embodiment shown in FIG. 15.

A projector base 200 is provided in the apparatus shown in FIG. 16. A panel connector 101 is provided on the base 200 and supports the panel 10 thereon. Also provided on the base 200 are an R light source connector 121, a G light source connector 143, a B light source connector 163, a prism support 181 and a lens support 320.

Panel electrodes 10A are disposed on the liquid crystal panel 10 as seen in FIG. 16. When the liquid crystal panel 10 is plugged into the panel connector 101, lead electrodes formed on the panel connector 101 are electrically connected to the panel electrodes 10A. The micro lens array 30 is preferably connected to the liquid crystal panel 10.

The G light source 14, which is shown as representation of the other light sources 16, 18, preferably includes a plurality of LEDs adapted to emit green lights (abbreviated as G-LED) 140 and arranged on a light source panel 141 which is preferably formed of an aluminum plate or the like in such a manner that the G-LEDs can be turned on and off. A light source panel electrode is disposed on a portion of the light source panel 141 to be plugged into the G light source connector 143 (on which a lead electrode is formed). As shown in FIG. 16, when the light source panel 141 is engaged with the G light source connector 143, the panel electrode is connected to the lead electrode. A cooling fin 142 is preferably provided to function as the cooling device on a rear surface of the light source panel 141. The R and B light sources not shown in FIG. 16 have an arrangement and are adapted to be mounted to the projector base 200 similar to those of the G light source 14.

By adjusting the number of G-LEDs arranged on the light source panel 141, the light emitting quantity of the light source can be adjusted. Furthermore, by adjusting the light emitting electric current to the LED in each light source panel, the light emitting quantity of each light source is adjusted, so that a desired color balance can be achieved. Moreover, by cooling the LED with the cooling fin, the light emitting luminance of the LED can be effectively improved.

The dichroic prism 18 is preferably engaged and fixed on the prism support 181, and the image forming lens 32 is positioned on the lens support 320. The lens support 320 is provided with a reference groove, a reference pin or another positioning means (not shown). The image forming lens 32 is located by the positioning means.

In this manner, after each member is assembled onto the projector base 200, each section is covered with a lid for entirely covering the projector base 200 or with the lid and a side surface cover in such a manner that each section is positioned in a target position. Additionally, the image information input, the light source drive, the controller and the power source or another electric system may be disposed inside the projector body constituted as aforementioned or disposed separately from the body.

In the preferred embodiment shown in FIG. 16, the R, G and B light sources preferably include the cooling devices 142. Also, the space modulation element 10, the R, G and B light sources 12, 14 and 16, the dichroic prism 18 and the image forming lens 32 are arranged on the same base 200.

Figure 18:
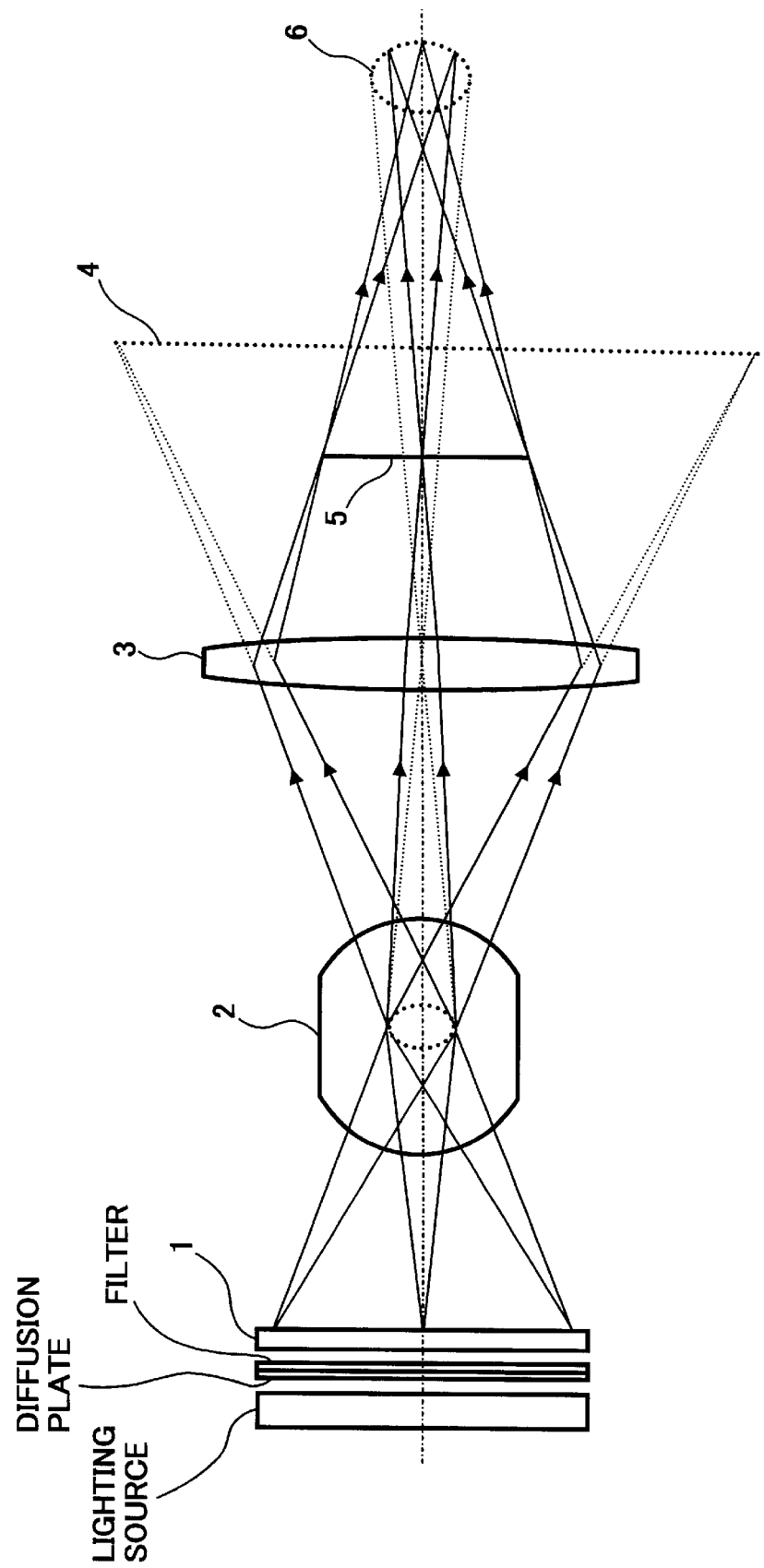
FIG. 18 is a view showing a basic concept of the virtual screen display device according to preferred embodiments of the present invention.

FIG. 18 is a view showing the basic concept of a virtual screen (VS) display device related to another preferred embodiment of the present invention. In an example, the display device is provided with a display 1 for displaying image information, a projection element 2 for projecting and forming an image of the display 1 as an object image in a predetermined space and an optical focusing element 3 for directing a light flux from a projected in-space image toward an observer's eyes.

The display 1 preferably comprises a CRT (cathode ray tube), an LCD (liquid crystal display), a DMD (digital mirror device) or another display which can display an output from a computer, a TV (television) image plane or the like. When the display 1 is CRT, an additional light source is unnecessary. In the case of LCD, however, a lighting source, a diffusion plate, a filter and the like are necessary on the rear surface of the display 1 as shown in FIG. 18.

The optical focusing element 3 for directing the light flux for forming an image in a position of a real screen (RS) 4 (the image forming position when there is no optical focusing system) toward the observer's eyes changes the direction of the light flux with a positive power, forms an in-space image in a position of a virtual screen (VS) 5 (the image of the real screen RS as an object of the optical focusing system) and brings a divergent light flux from the in-space image to a view region 6 in a range in which the observer's eyes are to be placed. As the optical focusing element 3, a positive lens or another transmission type image forming element is shown in FIG. 18, but a concave mirror or another reflective image forming element, a Fresnel optical element, or a hologram or another optical diffraction element can be used as the optical focusing element 3.

In preferred embodiments of the present invention, the virtual screen shown in FIG. 18 is formed for each of right and left eyes in such a manner that a stereoscopic image can be seen. The stereoscopic display device is preferably provided with two displays and two projection elements for both eyes and one optical focusing element for bringing light fluxes from two in-space images projected by the two projection elements to two predetermined view regions, respectively. Examples of preferred embodiments of the present invention will be described.

Figure 17:
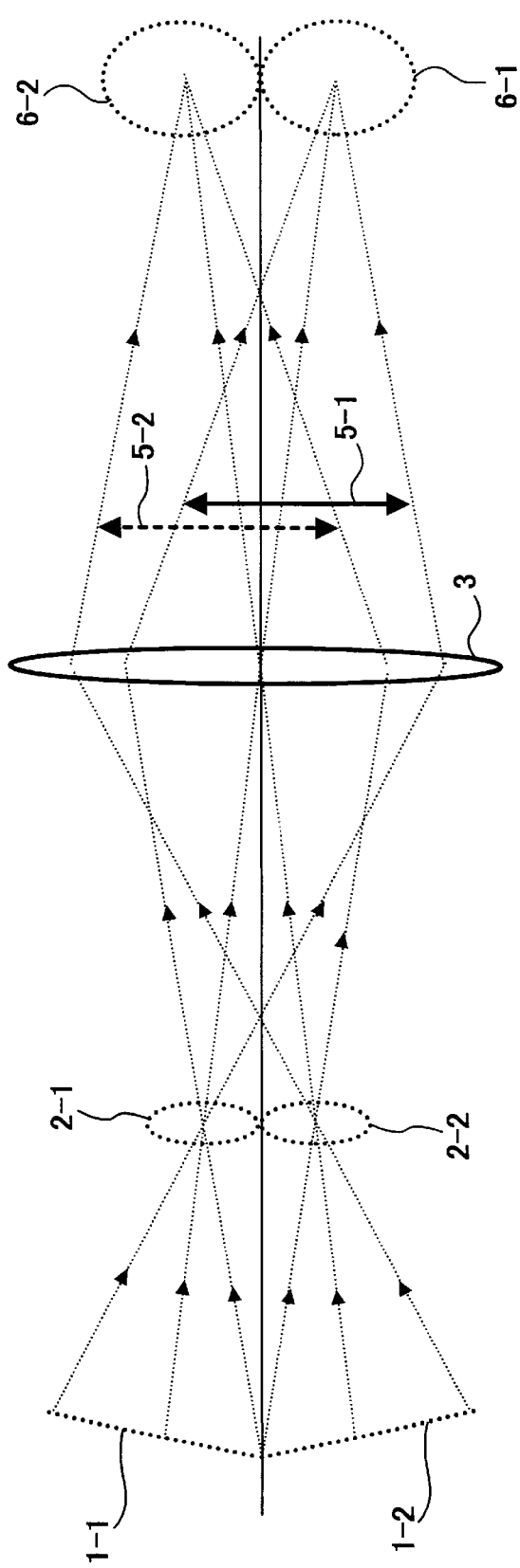
FIG. 17 is an explanatory view of an arrangement of a virtual screen stereoscopic display device according to a preferred embodiment of the present invention.

FIG. 17 is a view showing one preferred embodiment of the present invention. In FIG. 17, a left-eye display 1-1, a right-eye display 1-2, a left-eye projection element 2-1, a right-eye projection element 2-2, an optical focusing element 3, a left-eye virtual screen (VS) 5-1, a right-eye virtual screen (VS) 5-2, a left-eye view region 6-1 and a right-eye view region 6-2 are provided in the preferred embodiment shown therein.

In FIG. 17, a light flux emanating from the left-eye display 1-1 is operated by the left-eye projection element 2-1 in such a manner that an image is formed at a position of a real screen (RS) (not shown), and directed toward the optical focusing element 3. The optical focusing element 3 has a positive power to direct the incident light flux toward the left-eye view region 6-1 and additionally contribute to the image forming. Then, an image is formed on the left-eye VS 5-1. After the image forming, the light flux is diverged and passed through the left-eye view region 6-1. The optical focusing element 3 functions in such a manner that the light flux having each image height forms an image in the vicinity of the left-eye VS 5-1 and is directed to the left-eye view region 6-1. Thereby, when a left-eye pupil is placed in the left-eye view region 6-1, all the images having heights of the images of the left-eye display 1-1 can be seen at the same time.

In the same manner as for the left eye, the processing for the right eye is performed from the right-eye display 1-2 to the right-eye view region 6-2. Therefore, when a right eye pupil is placed in the right-eye view region 6-2, images having heights of all the images of the right-eye display 1-2 can be seen at the same time.

It is preferred that an interval between centers of the two view regions 6-1 and 6-2 is substantially equal to about 60 mm to about 70 mm and that the two view regions 6-1 and 6-2 abut against each other in a transverse direction or overlap each other slightly (by about 7 mm or less). In the system, although the left-eye VS 5-1 and the right-eye VS 5-2 overlap each other with a large area (for the convenience of illustration, in FIG. 1, the two VSs are deviated toward the optical axis of the optical focusing system, but actually they are deviated only slightly), information from the displays 1-1, 1-2 are brought toward the right and left eyes without interference. Furthermore, a range in which a stereoscopic image is visible is relatively broad, e.g., about 60 mm to about 70 mm.

Figure 19:
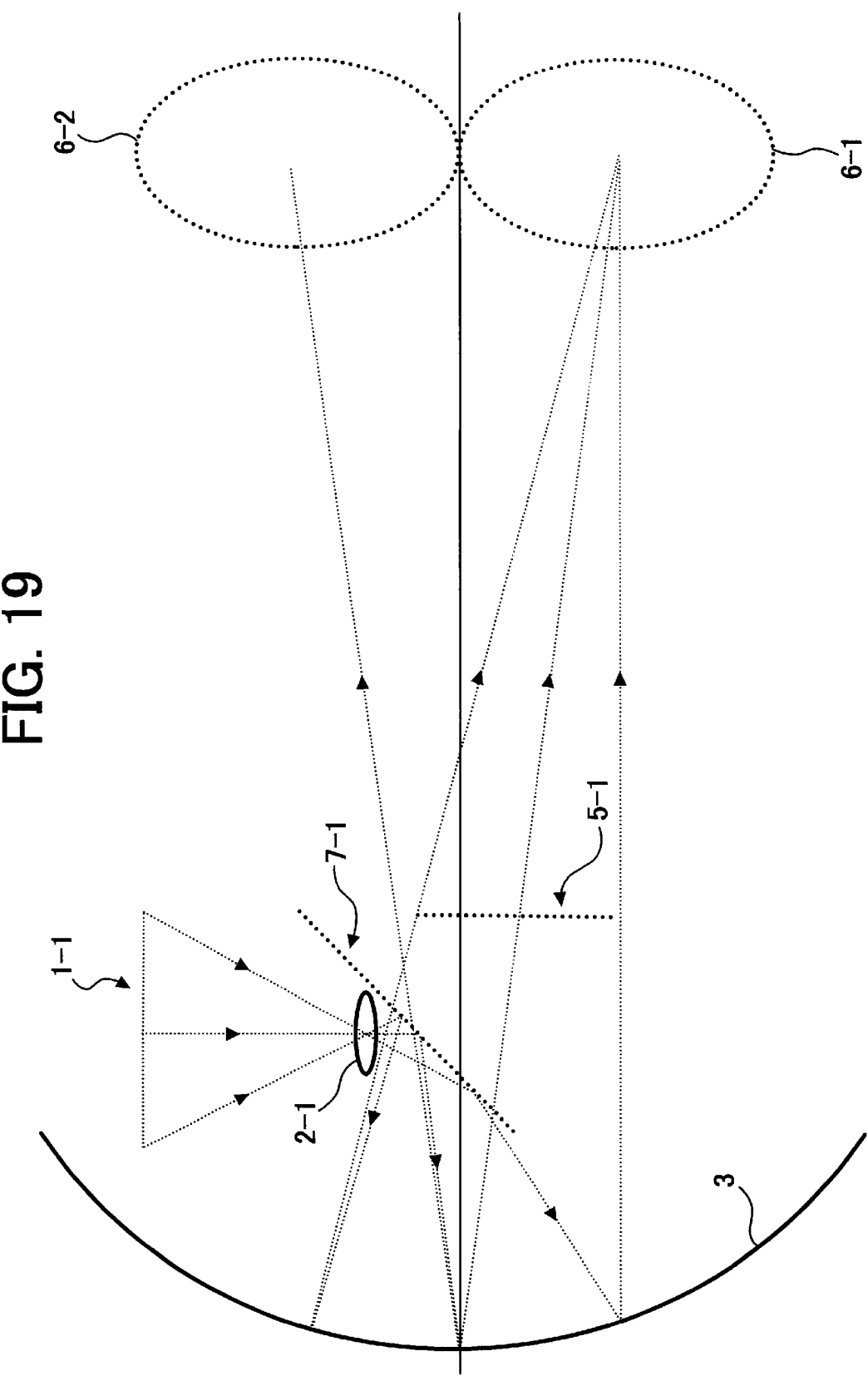
FIG. 19 is an explanatory view of an arrangement of a virtual screen stereoscopic display device according to another preferred embodiment of the present invention.

FIG. 19 is a view showing another preferred embodiment of the invention. In FIG. 19, the apparatus includes a left-eye display 1-1, a left-eye projection element 2-1, an optical focusing system 3, a left-eye virtual screen (VS) 5-1, a left-eye view region 6-1, a right-eye view region 6-2, and a left-eye bent mirror 7-1.

In FIG. 19, a light flux emanating from the left-eye display 1-1 is operated by the left-eye projection element 2-1 in such a manner that an image is formed in a position of a real screen (RS) (not shown), and directed toward the optical focusing system 3. In this case, the optical focusing system 3 is a concave mirror as shown, a hologram element functioning in a similar manner, a Fresnel element or the like, and has a positive power to direct the incident light flux toward the left-eye view region 6-1 and additionally contribute to the image forming. Then, an image is formed on the left-eye VS 5-1. After the image forming, the light flux is diverged and passed through the left-eye view region 6-1. The optical focusing element 3 functions in such a manner that the light flux having each image height forms an image in the vicinity of the left-eye VS 5-1 and is directed to the left-eye view region 6-1. Thereby, when a left-eye pupil is placed in the left-eye view region 6-1, all the images having heights of the images of the left-eye display 1-1 can be seen at the same time.

Here, the bent mirror 7-1 is used to facilitate the arrangement. Therefore, the optical axis of the optical focusing element 3 is not necessarily disposed perpendicular to the optical axis of the projection element 2-1 as shown in FIG. 19, and can be disposed substantially in parallel therewith. Furthermore, if necessary, the bent mirror 7-1 may be a half mirror. If possible, the arrangement without the bent mirror can be used.

To prevent FIG. 19 from being complicated, only the right-eye view region 6-2 is shown for the right eye and other parts of the device is omitted, but the arrangement for the right eye is symmetrical with that for the left-eye. In the same manner as for the left eye, the processing for the right eye is performed from the right-eye display to the right-eye view region 6-2. Therefore, when a right eye pupil is placed in the right-eye view region 6-2, images having heights of all the images of the right-eye display can be seen at the same time.

Here, characteristic respects are, in the same manner as in the preferred embodiment shown in FIG. 17, that an interval between centers of the two view regions 6-1 and 6-2 is approximately equal to about 60 mm to about 70 mm and that the two view regions 6-1 and 6-2 abut against each other in a transverse direction or overlap each other slightly by about 7 mm or less. In the system, although the left-eye VS 5-1 and the right-eye VS (not shown) overlap each other at a large area, information from the displays are brought toward the right and left eyes without interference. Furthermore, a range in which a stereoscopic image is visible is relatively broad, e.g., about 60 mm to about 70 mm.

Figure 20:
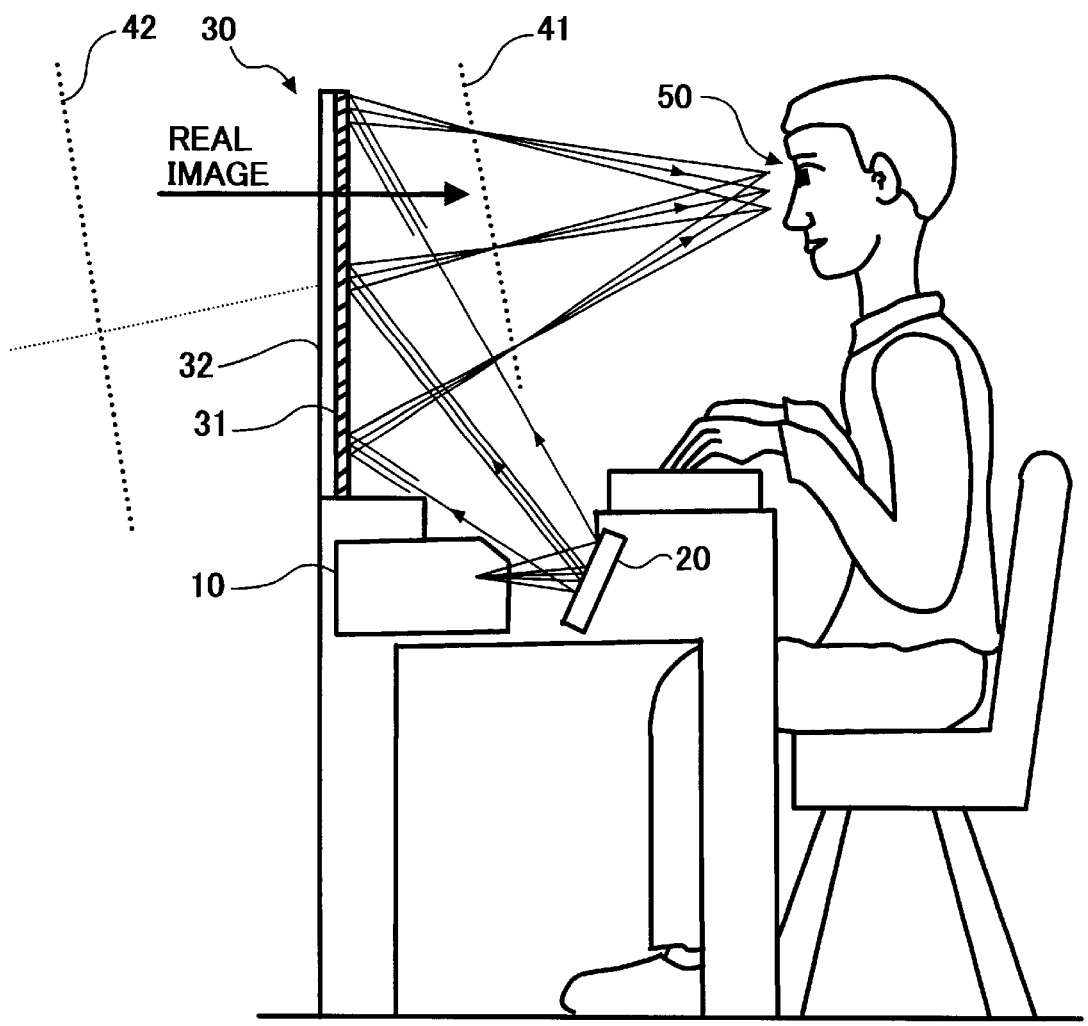
FIG. 20 is an explanatory view of an arrangement of a virtual screen stereoscopic display device according to still another preferred embodiment of the present invention.

FIG. 20 shows still another preferred embodiment of the present invention, and shows an example of a display device similar to a virtual screen display device of the applicant's prior application (Japanese Patent Application No. 9-57947/1997). In the prior-application display device, a plane image is displayed on a virtual screen, but in the preferred embodiment shown in FIG. 20, a stereoscopic image can be seen in substantially the same mode as in the prior application. In the preferred embodiment of FIG. 20, as in the preferred embodiments of FIGS. 17 and 19, optical systems other than a combiner (the optical focusing element 3 in FIGS. 17 and 19) are necessary both for right and left eyes. In FIG. 20, however, the optical system elements for both eyes are overlapped because the example is seen from a side view, and only one-side view is shown.

In FIG. 20, there are projectors 10 each provided with a display element and an optical projection system for right and left eyes. A light flux from each projector 10 is reflected by the bent mirror 20, then reflected and converged by a combiner 30, and enlarged to form an image in a position of a virtual screen (VS) 41 or 42. As a result, it seems to the operator's eyes 50 as if there is an enlarged display element in the VS position. At this time, the synthesis system of the optical system of the projector 10 and the combiner 30 is operated in such a manner that the VS 41 or 42 and the display element of the projector 10 form a conjugate relationship. On the other hand, the synthesis system of the optical lighting system and the optical projection system of the projector 10 and the combiner 30 is operated in such a manner that the operator's eyes 50 are in a conjugate positional relationship with the light source in the projector.

The combiner of the preferred embodiment shown in FIG. 20 preferably includes an optical diffraction element 31 which forms a hologram diffraction grating on a transparent base plate. Therefore, light fluxes can be collected in a direction which does not follow a reflection law on a flat surface as shown in FIG. 20. A similar operation can be performed by a concave mirror or a Fresnel mirror, but in this case, a half mirror or an appropriate reflectance or transmittance is necessary.

Furthermore, in FIG. 20, a see-through coefficient adjustment plate 32 is preferably provided and includes a PF-LCD (plastic/flexible liquid crystal). By electrically adjusting the transmittance, the see-through coefficient of the combiner 30 can be regulated.

The position of the virtual screen (VS) can be set optionally in the position 41 or 42 shown in FIG. 20 in accordance with the capability of the operator's eyes or the type of the operation. For example, the VS position 41 is an example in which the VS is set at the same visual degree as for a presbyopic person. The VS position 42 indicates a case in which a person talks while simultaneously seeing the other person and data indicated by the projected image during a meeting or the like. Further, the VS can be set in an indefinite distance.

As described above, in the virtual screen stereoscopic display device of preferred embodiments of the present invention, since the light fluxes from the image displays for right and left eyes are brought to both eyes without interference, the stereoscopic image can be easily seen without requiring special glasses or the like. Furthermore, the virtual screen is not a so-called virtual image but a real image which is formed in space. Substantially all of the light fluxes related with the image forming are brought to the eyes. Therefore, a very bright stereoscopic image with a luminance equal to the luminance of the image display is achieved. The device can thus contribute to the saving of power or energy. When the virtual screen stereoscopic display device is used as a computer terminal, an occupying space on a desk is remarkably reduced as compared with a conventional CRT display. Furthermore, a CRT image plane does not need to be seen directly. Therefore, eye fatigue is alleviated and health problems caused by electromagnetic waves are avoided.

Moreover, by providing the adjustment function of the image forming position (optical axis direction) as shown in the preferred embodiment of FIG. 20, the image forming position (optical axis direction) which is optimum for a user can be easily set at the time of operation, which can alleviate eye fatigue. Further, since the display can be positioned at a visual distance within a reach of a viewer, the device is convenient and favorable especially for a presbyopic person. Furthermore, by providing the combiner (optical focusing system) with the see-through function as shown in the preferred embodiment of FIG. 20, people can talk with each other while seeing the stereoscopically displayed data without looking down. Therefore, the device is capable of being used on a desk during the meeting or a lecture (for a lecturer, students and the like) and also can be used for a TV conference. Additionally, the device can also be used as a tele-prompter (a device with which a manuscript can be read without looking down) for the lecturer or an announcer. When the stereoscopic display is unnecessary, the same information can be presented on the right and left sides. Alternatively, by presenting different information not related with the stereoscopic display, the different information can be seen in each view region.

Furthermore, by providing the function of changing the see-through coefficient of the combiner (optical focusing system) as shown in the preferred embodiment of FIG. 20, the favorite see-through condition can be set in accordance with the environment. For example, the foreground is made unseen during work, but when talking with a person in front or at the time of the meeting, the see-through coefficient can be raised. Thereby, a working environment which previously easily caused stress, is now easily controlled by an operator/viewer to avoid any visual or mental stress or fatigue.

In the virtual screen stereoscopic display device, since the in-space image is seen, a visual angle is narrowed in principle, and a range in which an image plane is visible is restricted. However, considering the computer terminal is used usually by each individual person, a broad visual angle difficult to be designed is unnecessary, and rather a narrow visual angle with a high confidentiality is welcomed.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A virtual screen display apparatus comprising:
    a display arranged to generate display information and having an effective diagonal length DLC;
    an optical projecting element arranged to receive the display information from the display and to project and form an image, the optical projecting element having an effective F number which is defined by Fe=S1/PuD wherein S1 is a distance between the display and a principal point of the optical projecting element and PuD is a diameter of an exit pupil of the optical projecting element; and
    a field optical element arranged to form an in-space image in a position of a virtual screen and to direct a divergent light flux from the virtual screen to a view region where the image is viewable to an observer; wherein
        a diameter of a range in which the image is viewable to the observer in the view region is ERD and a diagonal length of the virtual screen is VSD and a distance between the virtual screen and the view region is VSP, and the following equation is satisfied:

VSD/VSP=DLC/(ERD×Fe).

2. The virtual screen display apparatus according to claim 1, wherein the field optical element is arranged such that an image of the in-space image is created at a retina of the observer when the retina of the observer is positioned in the view region.

3. The virtual screen display apparatus according to claim 1, wherein the optical projecting element comprises only a single lens.

4. The virtual screen display apparatus according to claim 1, wherein the field optical element comprises only a single lens.

5. The virtual screen display apparatus according to claim 1, wherein the following relationship is satisfied:

0.08<DLC/(ERD×Fe)<0.6.

6. The virtual screen display apparatus according to claim 1, wherein the display comprises at least one of a cathode ray tube, a liquid crystal display element and a digital mirror device.

7. The virtual screen display apparatus according to claim 1, wherein the optical projecting element is adapted to enlarge and project the image of an object displayed by the display.

8. The virtual screen display apparatus according to claim 1, wherein the optical projecting element comprises a projecting lens.

9. The virtual screen display apparatus according to claim 1, wherein the optical projection element comprises at least one of a positive lens, a reflective image forming element, a Fresnel optical system, a hologram, and a concave mirror.

10. A virtual screen display apparatus comprising:
    a display means for outputting display information and having an effective diagonal length DLC;
    an optical projecting means for receiving the display information from the display and for projecting and forming an image, the optical projecting element having an effective F number which is defined by Fe=S1/PuD wherein S1 is a distance between the display and a principal point of the optical projecting element and PuD is a diameter of an exit pupil of the optical projecting element; and
    a field optical means for forming an in-space image in a position of a virtual screen and for directing a divergent light flux from the virtual screen to form an image in a view region where the image is viewable to an observer; wherein
        a diameter of a range in which the image is viewable to the observer in the view region is ERD and a diagonal length of the virtual screen is VSD and a distance between the virtual screen and the view region is VSP, and the following equation is satisfied:

VSD/VSP=DLC/(ERD×Fe).

11. The virtual screen display apparatus according to claim 10, wherein the optical projecting means comprises only a single lens.

12. The virtual screen display apparatus according to claim 10, wherein the field optical means comprises only a single lens.

13. The virtual screen display apparatus according to claim 10, wherein the following relationship is satisfied:

0.08<DLC/(ERD×Fe)<0.6.

14. The virtual screen display apparatus according to claim 10, wherein the display means comprises at least one of a cathode ray tube, a liquid crystal display element and a digital mirror device.

15. The virtual screen display apparatus according to claim 10, wherein the optical projecting means enlarges and projects the image of an object displayed by the display means.

16. The virtual screen display apparatus according to claim 10, wherein the optical projecting means comprises a projecting lens.

17. The virtual screen display apparatus according to claim 10, wherein the optical projection means comprises at least one of a positive lens, a reflective image forming element, a Fresnel optical system, a hologram, and a concave mirror.

18. A method of manufacturing a virtual screen display apparatus comprising the steps of:
    providing a display for generating display information and having an effective diagonal length DLC;
    providing an optical projecting element adjacent to the display to receive the display information from the display and to project and form an image, the optical projecting element having an effective F number which is defined by Fe=S1/PuD wherein S1 is a distance between the display and a principal point of the optical projecting element and PuD is a diameter of an exit pupil of the optical projecting element; and
    providing a field optical element adjacent to the optical projecting element to form an in-space image in a position of a virtual screen and to direct a divergent light flux from the virtual screen to form an image in a view region where the image is viewable to an observer; and
    selecting the display, the optical projecting element and the field optical element to have characteristics such that the following equation is satisfied:

VSD/VSP=DLC/(ERD×Fe), wherein a diameter of a range in which the image is viewable to the observer in the view region is ERD and a diagonal length of the virtual screen is VSD and a distance between the virtual screen and the view region is VSP.

19. The method according to claim 18, wherein the optical projecting element comprises only a single lens.

20. The method according to claim 18, wherein the field optical element comprises only a single lens.

21. The method according to claim 18, wherein the step of selecting the display, the optical projecting element and the field optical element is performed such that the display, the optical projecting element and the field optical element have characteristics such that the following relationship is satisfied:

$$0.08 < DLC/(ERD \times Fe) < 0.6.$$

22. The method according to claim 18, wherein the display comprises at least one of a cathode ray tube, a liquid crystal display element and a digital mirror device.

23. The method according to claim 18, wherein the optical projecting element is adapted to enlarge and project the image of an object displayed by the display.

24. The method according to claim 18, wherein the optical projecting element comprises a projecting lens.

25. The method according to claim 18, wherein the optical projection element comprises at least one of a positive lens, a reflective image forming element, a Fresnel optical system, a hologram, and a concave mirror.

26. A television comprising:
a display arranged to generate display information and having an effective diagonal length DLC;
an optical projecting element arranged to receive the display information from the display and to project and form an image, the optical projecting element having an effective F number which is defined by Fe=S1/PuD wherein S1 is a distance between the display and a principal point of the optical projecting element and PuD is a diameter of an exit pupil of the optical projecting element; and
a field optical element arranged to form an in-space image in a position of a virtual screen and to direct a divergent light flux from the virtual screen to a view region where the image is viewable to an observer; wherein
a diameter of a range in which the image is viewable to the observer in the view region is ERD and a diagonal length of the virtual screen is VSD and a distance between the virtual screen and the view region is VSP, and the following equation is satisfied:

$$VSD/VSP = DLC/(ERD \times Fe).$$

27. A television telephone apparatus comprising:
a display arranged to generate display information and having an effective diagonal length DLC;
an optical projecting element arranged to receive the display information from the display and to project and form an image, the optical projecting element having an effective F number which is defined by Fe=S1/PuD wherein S1 is a distance between the display and a principal point of the optical projecting element and PuD is a diameter of an exit pupil of the optical projecting element; and
a field optical element arranged to form an in-space image in a position of a virtual screen and to direct a divergent light flux from the virtual screen to a view region where the image is viewable to an observer; wherein
a diameter of a range in which the image is viewable to the observer in the view region is ERD and a diagonal length of the virtual screen is VSD and a distance between the virtual screen and the view region is VSP, and the following equation is satisfied:

$$VSD/VSP = DLC/(ERD \times Fe).$$

28. A computer comprising:
a display arranged to generate display information and having an effective diagonal length DLC;
an optical projecting element arranged to receive the display information from the display and to project and form an image, the optical projecting element having an effective F number which is defined by Fe=S1/PuD wherein S1 is a distance between the display and a principal point of the optical projecting element and PuD is a diameter of an exit pupil of the optical projecting element; and
a field optical element arranged to form an in-space image in a position of a virtual screen and to direct a divergent light flux from the virtual screen to a view region where the image is viewable to an observer; wherein
a diameter of a range in which the image is viewable to the observer in the view region is ERD and a diagonal length of the virtual screen is VSD and a distance between virtual screen and the view region is VSP, and the following equation is satisfied:

$$VSD/VSP = DLC/(ERD \times Fe).$$

29. A computer according to claim 28, wherein the computer is a laptop computer.

30. A computer according to claim 28, wherein the computer is a notebook computer.

31. A computer according to claim 28, wherein the computer is a miniature mobile computer.

32. A computer according to claim 28, wherein the computer is a desktop personal computer.

33. A video player comprising:
a display arranged to generate display information and having an effective diagonal length DLC;
an optical projecting element arranged to receive the display information from the display and to project and form an image, the optical projecting element having an effective F number which is defined by Fe=S1/PuD wherein S1 is a distance between the display and a principal point of the optical projecting element and PuD is a diameter of an exit pupil of the optical projecting element; and
a field optical element arranged to form an in-space image in a position of a virtual screen and to direct a divergent light flux from the virtual screen to a view region where the image is viewable to an observer; wherein
a diameter of a range in which the image is viewable to the observer in the view region is ERD and a diagonal length of the virtual screen is VSD and a distance between the virtual screen and the view region is VSP, and the following equation is satisfied:

$$VSD/VSP = DLC/(ERD \times Fe).$$

34. The video player according to claim 33, wherein the video player is a video tape player.

35. The video player according to claim 33, wherein the video player is a digital video disc player.

36. A virtual screen display apparatus comprising:
a display arranged to generate display information and having an effective diagonal length DLC;
an optical projecting element arranged to receive the display information from the display and to project and form an image, the optical projecting element having an effective F number which is defined by Fe=S1/PuD wherein SI is a distance between the display and a principal point of the optical projecting element and PuD is a diameter of an exit pupil of the optical projecting element; and
a field optical element arranged to form an in-space image in a position of a virtual screen and to direct a divergent light flux from the virtual screen to a view region where the image is viewable to an observer; wherein
a diameter of a range in which the image is viewable to the observer in the view region is ERD and a diagonal length of the virtual screen is VSD and a distance between the virtual screen and the view region is VSP, and the following equation is satisfied:

VSD/VSP=DLC/(ERD×Fe).

* * * * *